United States Patent
Hata et al.

(10) Patent No.: US 7,642,042 B2
(45) Date of Patent: Jan. 5, 2010

(54) POLYMER, TOP COATING LAYER, TOP COATING COMPOSITION AND IMMERSION LITHOGRAPHY PROCESS USING THE SAME

(75) Inventors: Mitsuhiro Hata, Seongnam-si (KR); Sang-Jun Choi, Seoul (KR); Sang-Gyun Woo, Yongin-si (KR); Man-Hyoung Ryoo, Hwaseong-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 427 days.

(21) Appl. No.: 11/585,082

(22) Filed: Oct. 24, 2006

(65) Prior Publication Data

US 2007/0155925 A1    Jul. 5, 2007

(30) Foreign Application Priority Data

Oct. 24, 2005    (KR)    ................. 10-2005-0100412

(51) Int. Cl.
    *G03F 7/11*    (2006.01)
    *G03F 7/30*    (2006.01)
(52) U.S. Cl. ............. 430/325; 430/326; 430/273.1; 525/329.7; 525/326.5; 525/61; 525/326.2; 525/328.8
(58) Field of Classification Search ............. None
    See application file for complete search history.

(56) References Cited

U.S. PATENT DOCUMENTS

| | | | | |
|---|---|---|---|---|
| 5,221,768 A | * | 6/1993 | Kato et al. | ........... 562/598 |
| 2003/0059398 A1 | * | 3/2003 | Ranger et al. | ......... 424/78.08 |
| 2004/0024157 A1 | * | 2/2004 | Okazaki et al. | ........... 526/319 |
| 2006/0092533 A1 | * | 5/2006 | Sogard | ........... 359/832 |
| 2006/0244938 A1 | * | 11/2006 | Schuster | ............ 355/53 |
| 2007/0043242 A1 | * | 2/2007 | Sugano et al. | ........... 564/123 |
| 2007/0105704 A1 | * | 5/2007 | Bookbinder et al. | ........ 501/54 |
| 2008/0008955 A1 | * | 1/2008 | Brodsky et al. | ......... 430/270.1 |

FOREIGN PATENT DOCUMENTS

| | | |
|---|---|---|
| JP | 2005-150450 | 6/2005 |
| JP | 2005-157259 | 6/2005 |
| JP | 2005-173474 | 6/2005 |

* cited by examiner

*Primary Examiner*—Cynthia Hamilton
(74) *Attorney, Agent, or Firm*—Harness, Dickey & Pierce, P.L.C.

(57) ABSTRACT

A polymer, a top coating layer, a top coating composition and an immersion lithography process using the same are disclosed. The top coating layer polymer may include a deuterated carboxyl group having a desired acidity such that the top coating layer polymer may be insoluble with water and a photoresist, and soluble in a developer. The polymer may be included in a top coating layer and a top coating composition.

48 Claims, 10 Drawing Sheets

POLYMER, TOP COATING LAYER, TOP COATING COMPOSITION AND IMMERSION LITHOGRAPHY PROCESS USING THE SAME

PRIORITY STATEMENT

This U.S. non-provisional patent application claims the benefit of priority under 35 U.S.C § 119 from Korean Patent Application 2005-100412, filed on Oct. 24, 2005 in the Korean Intellectual Property Office, the entire contents of which are hereby incorporated by reference in their entirety.

BACKGROUND OF THE INVENTION

1. Field of the Invention

Example embodiments relate to a semiconductor device and a method of using the same. Other example embodiments relate to a polymer, a top coating layer, a top coating composition and an immersion lithography process using the same.

2. Background of the Invention

As semiconductor devices become more integrated, finer and more exact patterning may be necessary. The critical dimensions of photoresist patterns formed during an exposure process are determined by Rayleigh's equation $R=(k1)(\lambda/NA)$ wherein R represents resolution, k1 represents a process constant, $\lambda$ represents a wavelength of a light source and NA (Numerical Aperture) represents an effective diameter of a lens. In order to reduce the resolution, the process constant (k1) may be smaller, the wavelength of a light source ($\lambda$) may be shorter and/or the effective aperture of a lens (NA) may be increased.

In order to generate a light source having a lower wavelength ($\lambda$) than KrF (248-nm) or ArF (193-nm), an exposure process may be performed using EUV (Extreme Ultraviolet) as a light source having a wavelength ($\lambda$) of 13.4 nm. The exposure process using EUV may necessitate different (or alternative) conditions than conventional exposure processes. Exposure equipment used for EUV may be costly. Due to the difficulties associated with using EUV, it may be desirous to perform the exposure process using an alternative light source and/or method.

In Rayleigh's equation, NA may be proportional to $n(\sin \theta)$ wherein n represents a refractive index of a medium between a lens and a photoresist. If n increases, then the resolution (R) decreases.

In an exposure process exploiting the relationship between the resolution and the refractive index, an immersion lithography process may be performed. The immersion lithography process may be performed using ArF as a light source in a medium having a higher refractive index than air. Water has a refractive index of 1.44, and air has a refractive index of 1. As such, water may be used as the medium.

If the immersion lithography process is performed using water as the medium, then a photosensitive polymer, a photoacid generator and a solvent in a photoresist layer contacting water may dissolve in water. If the immersion lithography process is performed using the water as the medium, air bubbles may form at an interface between water and the photoresist layer, making formation of exact photoresist patterns more difficult.

Because of the solubility of the polymer, the generator and the solvent in water and/or the formation of the bubbles, a top coating layer may be necessary. The top coating layer may protect the photoresist layer from water. The top coating layer may have a stronger hydrophobicity, and thereby insoluble with the photoresist layer. The top coating layer may have a light transmitting property. The top coating layer may be more easily removed with a developer.

SUMMARY OF THE INVENTION

Example embodiments relate to a semiconductor device and a method of forming the same. Other example embodiments relate to a top coating polymer, a top coating layer, a top coating composition and an immersion lithography process using the same.

Example embodiments are directed to top coating layer polymers having a stronger hydrophobicity and increased solubility in a developer, and a top coating composition having at least one of the polymers.

Example embodiments are directed to immersion lithography process capable of finer and more exact patterning.

The polymer may include a deuterated carboxyl group. The deuterated carboxyl group may include deuterium (D). Deuterium (D), having one proton and one neutron, is an allotrope of hydrogen (H). The deuterated carboxyl group may have a weaker acidity due to an isotope effect than a carboxyl group having hydrogen. The polymer having the deuterated carboxyl group may not mix with (or be insoluble in) water or a photoresist. The deuterated carboxyl group may have enough acidity to be dissolved by a developer in order that the polymer having the deuterated carboxyl group has a greater solubility with respect to the developer. As such, if an immersion lithography process is performed using the polymer, then it may be possible to form photoresist patterns having better profiles.

In other example embodiments, the polymer may include Chemical Structure (1) including a first monomer (Z) and a second monomer $-C_3O_2R_1R_2D$ having a deuterated carboxyl group. Chemical Structure (1) is

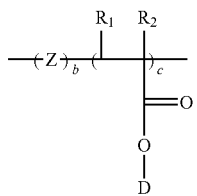

CHEMICAL STRUCTURE (1)

wherein $R_1$ represents hydrogen or $-COOR_3$, wherein $R_3$ represents deuterium, a deuterated or hydrogenated normal alkyl group including 1-20 carbons, a deuterated or hydrogenated branched alkyl group including 1-20 carbons, $R_2$ represents hydrogen or a methyl group, Z is at least one selected from the group consisting of vinyl type monomer, allyl type monomer and acrylate type monomer. The average molecular weight of the polymer may be 1,000-100,000. In example embodiments, the expression b+c=1 is satisfied.

The Z may be at least one selected from the group consisting of vinylalcohol, methylvinylether, ethylvinylether, 3,4-dihydropyran, 2,3-dihydrofuran, trimethylvinylsilane, triethylvinylsilane, allyl-2,2,2-trifluoroether, allylalcohol, allylethylether, allyl-n-propylether, allyltrimethylsilane, heptafluoro-3,3-bis(trifluoromethyl)-1-hexane, 1H,1H,2H-heptafluoropent-1-ene, 3,3,4,4,4-Pentafluorobutene, 1H,1H,2H-perfluoro-1-decene, 1H,1H,2H-perfluoro-1-dodecene, 1H,1H,2H-perfluoro-1-hexene, 3-(perfluoro-n-hexyl)prop-2-en-1-ol, 11-(perfluoro-n-hexyl)undec-10-en-1-ol, 1H,1H, 2H-perfluoro-1-octene, (3-perfluoro-n-octyl)prop-2-enol, 11-(perfluoro-n-octyl)undec-10-en-1-ol, (2H-perfluoropropyl)-2-propenylether, 1,1,1-trifluoro-2-butene, 4,4,4-trifluorobut-2-en-1-ol, 2-(trifluoromethyl)propene, 3,3,3-trifluoropropene, 4,5,5,6,6,6-hexafluoro-4-(trifluoromethyl)-hex-2-ene, 4,5,5,6,6,6-hexafluoro-3-(trimethyl)-hex-2-en-1-ol, 1,1,1,2,2,3-hexafluoro-3-trifluoromethylnon-4-ene, 1H,1H,7H-perfluorohept-1-ene, 11-(perfluoro-n-octyl)undec-10-en-1-ol, (2H-perfluoropropyl)-2-propenylether, 1,1,1-trifluoro-2-butene, and 4,4,4-trifluorobut-2-en-1-ol.

The Z may be $CH_2C(R_4)COO(R_5)$ wherein $R_4$ represents hydrogen or a methyl group, and $R_5$ is at least one selected from the group consisting of a normal or branched alkyl group including 1-20 carbons, t-butyl, isonorbornyl, 2-methyl-2-adamantyl, 2-ethyl-2-adamantyl, 3-tetrahydrofuranyl, 3-oxocyclohexyl, γ-butyllactone-3-yl, mavaloniclactone, γ-butyro lactone-2-yl, 3-methyl-γ-butyrolactone-3-yl, 2-tetrahydropyranyl, 2-tetrahydrofuranyl, 2,3-propylenecarbonate-1-yl, 1-methoxyethyl, 1-ethoxyethyl, 1-(2-methoxyethoxy)ethyl, 1-(2-acetoxyethoxy)ethyl, t-buthoxycarbonylmethyl, methoxymethyl, ethoxymethyl, trifluoromethyl and α,α,α-trifluoroethyl.

The $R_3$ may be at least one selected from the group consisting of deuterium, methyl, ethyl, n-propyl, i-propyl, n-butyl, i-butyl, t-butyl, trifluoromethyl, α,α,α-trifluoroethyl and trideuteriomethyl.

The $R_1$ may be —$COOR_3$ wherein the polymer has Chemical Structure (2)

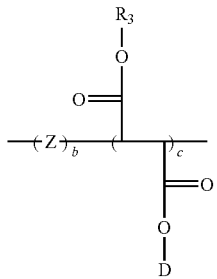

CHEMICAL STRUCTURE (2)

The polymer may further include a third monomer (X) wherein the polymer has Chemical Structure (3):

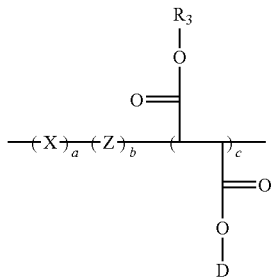

CHEMICAL STRUCTURE (3)

wherein X is at least one selected from the group consisting of a vinyl type monomer and an allyl type monomer. In example embodiments, the expression a+b+c=1 is satisfied.

X may be at least one selected from the group consisting of vinylalcohol, methylvinylether, ethylvinylether, 3,4-dihydropyran, 2,3-dihydrofuran, trimethylvinylsilane, triethylvinylsilane, allyl-2,2,2-trifluoroether, allylalcohol, allylethylether, allyl-n-propylether, allyltrimethylsilane, heptafluoro-3,3-bis(trifluoromethyl)-1-hexane, 1H,1H,2H-heptafluoropent-1-ene, 3,3,4,4,4-Pentafluorobutene, 1H,1H,2H-perfluoro-1-decene, 1H,1H,2H-perfluoro-1-dodecene, 1H,1H,2H-perfluoro-1-hexene, 3-(perfluoro-n-hexyl)prop-2-en-1-ol, 11-(perfluoro-n-hexyl)undec-10-en-1-ol, 1H,1H,2H-perfluoro-1-octene, (3-perfluoro-n-octyl)prop-2-enol, 11-(perfluoro-n-octyl)undec-10-en-1-ol, (2H-perfluoropropyl)-2-propenylether, 1,1,1-trifluoro-2-butene, 4,4,4-trifluorobut-2-en-1-ol, 2-(trifluoromethyl)propene, 3,3,3-trifluoropropene, 4,5,5,6,6,6-hexafluoro-4-(trifluoromethyl)-hex-2-ene, 4,5,5,6,6,6-hexafluoro-3-(trimethyl)-hex-2-en-1-ol, 1,1,1,2,2,3-hexafluoro-3-trifluoromethylnon-4-ene, 1H,1H,7H-perfluorohept-1-ene, 11-(perfluoro-n-octyl)undec-10-en-1-ol, (2H-perfluoropropyl)-2-propenylether, 1,1,1-trifluoro-2-butene and 4,4,4-trifluorobut-2-en-1-ol.

In Chemical Structure (2) and Chemical Structure (3), Z may be at least one selected from the group consisting of vinylalcohol, methylvinylether, ethylvinylether, 3,4-dihydropyran, 2,3-dihydrofuran, trimethylvinylsilane, triethylvinylsilane, allyl-2,2,2-trifluoroether, allylalcohol, allylethylether, allyl-n-propylether, allyltrimethylsilane, heptafluoro-3,3-bis(trifluoromethyl)-1-hexane, 1H,1H,2H-heptafluoropent-1-ene, 3,3,4,4,4-Pentafluorobutene, 1H,1H,2H-perfluoro-1-decene, 1H,1H,2H-perfluoro-1-dodecene, 1H,1H,2H-perfluoro-1-hexene, 3-(perfluoro-n-hexyl)prop-2-en-1-ol, 11-(perfluoro-n-hexyl)undec-10-en-1-ol, 1H,1H,2H-perfluoro-1-octene, (3-perfluoro-n-octyl)prop-2-enol, 11-(perfluoro-n-octyl)undec-10-en-1-ol, (2H-perfluoropropyl)-2-propenylether, 1,1,1-trifluoro-2-butene, 4,4,4-trifluorobut-2-en-1-ol, 2-(trifluoromethyl)propene, 3,3,3-trifluoropropene, 4,5,5,6,6,6-hexafluoro-4-(trifluoromethyl)-hex-2-ene, 4,5,5,6,6,6-hexafluoro-3-(trimethyl)-hex-2-en-1-ol, 1,1,1,2,2,3-hexafluoro-3-trifluoromethylnon-4-ene, 1H,1H,7H-perfluorohept-1-ene, 11-(perfluoro-n-octyl)undec-10-en-1-ol, (2H-perfluoropropyl)-2-propenylether, 1,1,1-trifluoro-2-butene and 4,4,4-trifluorobut-2-en-1-ol.

Z may be —$C_3OOR_4R_5$, forming the polymer having Chemical Structure (4)

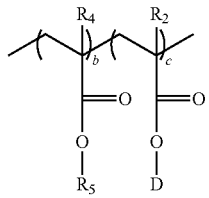

CHEMICAL STRUCTURE (4)

wherein $R_2$ and $R_4$ are hydrogen or a methyl group, and $R_5$ is at least one selected from the group consisting of normal or branched alkyl group including 1-20 carbons, t-butyl, isonorbornyl, 2-methyl-2-adamantyl, 2-ethyl-2-adamantyl, 3-tetrahydrofuranyl, 3-oxocyclohexyl, γ-butyllactone-3-yl, mavaloniclactone, γ-butyro lactone-2-yl, 3-methyl-γ-butyrolactone-3-yl, 2-tetrahydropyranyl, 2-tetrahydrofuranyl, 2,3-propylenecarbonate-1-yl, 1-methoxyethyl, 1-ethoxyethyl, 1-(2-methoxyethoxy)ethyl, 1-(2-acetoxyethoxy)ethyl, t-buthoxycarbonylmethyl, methoxymethyl, ethoxymethyl, trifluoromethyl and α,α,α-trifluoroethyl.

The top coating composition may include at least one of the polymers described above and an organic solvent. The organic solvent may include 4-12 carbons. The polymer, in the organic solvent, may include a percentage of solution by weight (weight %) of 0.1-5% of the total weight of the top coating composition. The polymer may include 1.0-3.0 weight % of the total weight of the top coating composition.

The organic solvent may be insoluble with water and a photoresist. The organic solvent may be at least one selected from the group consisting of n-propylalcohol, i-propylalcohol, n-butanol, 2-butanol, 3-methyl-2-butanol, n-pentanol, 2-pentanol, 3-methyl-2-pentanol, 4-methyl-2-pentanol, 1-octanol, 2-octanol, 1-decanol, 2-decanol, deuterated-n-propylalcohol-d, deuterated-i-propylalcohol-d, deuterated-n-butanol-d, deuterated-2-butanol-d, deuterated-3-methyl-2-butanol-d, deuterated-n-pentanol-d, deuterated-2-pentanol-d, deuterated-3-methyl-2-pentanol-d, deuterated-4-methyl-2-pentanol-d, deuterated-1-octanol-d, deuterated-2-octanol-d, deuterated-1-decanol-d, deuterated-2-decanol-d, n-heptane, n-octane, n-nonane, n-decane, n-undecane and n-dodecane.

The top coating composition may be formed by dissolving the polymer into the organic solvent and filtering the resulting solution. The solution may be applied on various chemical-amplified positive-type or negative type photoresists (e.g., g-line photoresist, i-line photoresist, KrF photoresist, ArF photoresist, $F_2$ photoresist, etc.).

The immersion lithography process may include forming a photoresist layer on (or over) a wafer; forming a top coating layer on the photoresist layer; loading the wafer having the top coating layer into water; performing an exposure process with respect to the photoresist layer; and removing the top coating layer and softened photoresist layer to form photoresist patterns. The top coating layer may include the polymer.

Forming the top coating layer may include coating a top coating composition including the polymer and the organic solvent on the photoresist layer; and baking the wafer.

The coating of the top coating composition on the photoresist layer may include spin coating the top coating composition on the photoresist for approximately 30-90 seconds at a spin speed of 500-3000 rpm. The spin speed may be 1500-2000 rpm in order to more uniformly coat and reduce (or eliminate) any defects. The baking may be performed at a temperature of 100° C. for 60-90 seconds.

BRIEF DESCRIPTION OF THE DRAWINGS

The accompanying drawings, which are included to provide a further understanding of the example embodiments and are incorporated in and constitute a part of this application.

FIGS. 1 through 6 are diagrams illustrating cross-sectional views an immersion lithography process according to example embodiments, and FIGS. 7 through 22 are photographs of photoresist patterns formed by example embodiments.

DETAILED DESCRIPTION OF EXAMPLE EMBODIMENTS

Figure 1:
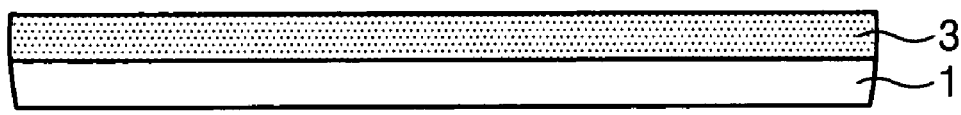
FIGS. 1-22 illustrate example embodiments and together with the description function to explain the principle of the invention.

Various example embodiments will now be described more fully with reference to the accompanying drawings in which some example embodiments are shown. In the drawings, the thicknesses of layers and regions may be exaggerated for clarity.

Detailed illustrative embodiments are disclosed herein. However, specific structural and functional details disclosed herein are merely representative for purposes of describing example embodiments. This invention may, however, may be embodied in many alternate forms and should not be construed as limited to only the example embodiments set forth herein.

Accordingly, while the example embodiments are capable of various modifications and alternative forms, embodiments thereof are shown by way of example in the drawings and will herein be described in detail. It should be understood, however, that there is no intent to limit example embodiments to the particular forms disclosed, but on the contrary, the example embodiments are to cover all modifications, equivalents, and alternatives falling within the scope of the invention. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the scope of the example embodiments.

Spatially relative terms, such as "beneath," "below," "lower," "above," "upper" and the like, may be used herein for ease of description to describe one element or a relationship between a feature and another element or feature as illustrated in the figures. It will be understood that the spatially relative terms are intended to encompass different orientations of the device in use or operation in addition to the orientation depicted in the Figures. For example, if the device in the figures is turned over, elements described as "below" or "beneath" other elements or features would then be oriented "above" the other elements or features. Thus, for example, the term "below" can encompass both an orientation which is above as well as below. The device may be otherwise oriented (rotated 90 degrees or viewed or referenced at other orientations) and the spatially relative descriptors used herein should be interpreted accordingly.

Example embodiments are described herein with reference to cross-sectional illustrations that are schematic illustrations of idealized embodiments (and intermediate structures). As such, variations from the shapes of the illustrations as a result, for example, of manufacturing techniques and/or tolerances, may be expected. Thus, example embodiments should not be construed as limited to the particular shapes of regions illustrated herein but may include deviations in shapes that result, for example, from manufacturing. For example, an implanted region illustrated as a rectangle may have rounded or curved features and/or a gradient (e.g., of implant concentration) at its edges rather than an abrupt change from an implanted region to a non-implanted region. Likewise, a buried region formed by implantation may result in some implantation in the region between the buried region and the surface through which the implantation may take place. Thus, the regions illustrated in the figures are schematic in nature and their shapes do not necessarily illustrate the actual shape of a region of a device and do not limit the scope.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In order to more specifically describe example embodiments, various aspects will be described in detail with reference to the attached drawings. However, the present invention is not limited to the example embodiments described.

Example embodiments relate to a semiconductor device and a method of using the same. Other example embodiments relate to a polymer, a top coating layer, a top coating composition and an immersion lithography process using the same.

FIGS. 1 through 6 are diagrams illustrating cross-sectional views of an immersion lithography process according to example embodiments.

Referring to FIG. 1, an anti-refractive layer (not shown) may be formed on (or over) a wafer 1. A photoresist layer 3 may be formed on the anti-refractive layer. The photoresist layer 3 may be formed by performing a coating and a baking process.

Figure 2:

Referring to FIG. 2, a top coating composition 5 may be coated on the photoresist layer 3. The top coating composition 5 may be formed by mixing a polymer having Chemical Structure (1) (shown below) into an organic solvent having 4-12 carbons. Chemical Structure (1) is

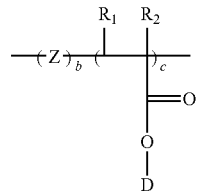

CHEMICAL STRUCTURE (1)

wherein $R_1$ represents hydrogen or —$COOR_3$ wherein $R_3$ is deuterium, a deuterated or hydrogenated normal alkyl group including 1-20 carbons, or a deuterated or hydrogenated branched alkyl group including 1-20 carbons, $R_2$ is hydrogen or a methyl group, Z is at least one selected from the group consisting of a vinyl type monomer, an allyl type monomer and an acrylate type monomer. The average molecular weight of the polymer is 1,000-100,000. In example embodiments, the expression b+c=1 is satisfied.

The vinyl "type" monomer may include a monomer having the following functional group:

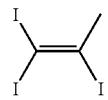

VINYL FUNCTIONAL GROUP

The allyl "type" monomer may include a monomer having the following functional group:

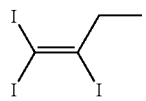

ALLYL FUNCTIONAL GROUP

The acrylate "type" monomer may include a monomer having the following functional group:

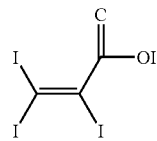

ACRYLATE FUNCTIONAL GROUP

Z may be at least one selected from the group consisting of vinylalcohol, methylvinylether, ethylvinylether, 3,4-dihydropyran, 2,3-dihydrofuran, trimethylvinylsilane, triethylvinylsilane, allyl-2,2,2-trifluoroether, allylalcohol, allylethylether, allyl-n-propylether, allyltrimethylsilane, heptafluoro-3,3-bis(trifluoromethyl)-1-hexane, 1H,1H,2H-heptafluoropent-1-ene, 3,3,4,4,4-Pentafluorobutene, 1H,1H,2H-perfluoro-1-decene, 1H,1H,2H-perfluoro-1-dodecene, 1H,1H,2H-perfluoro-1-hexene, 3-(perfluoro-n-hexyl)prop-2-en-1-ol, 11-(perfluoro-n-hexyl)undec-10-en-1-ol, 1H,1H,2H-perfluoro-1-octene, (3-perfluoro-n-octyl)prop-2-enol, 11-(perfluoro-n-octyl)undec-10-en-1-ol, (2H-perfluoropropyl)-2-propenylether, 1,1,1-trifluoro-2-butene, 4,4,4-trifluorobut-2-en-1-ol, 2-(trifluoromethyl)propene, 3,3,3-trifluoropropene, 4,5,5,6,6,6-hexafluoro-4-(trifluoromethyl)-hex-2-ene, 4,5,5,6,6,6-hexafluoro-3-(trimethyl)-hex-2-en-1-ol, 1,1,1,2,2,3-hexafluoro-3-trifluoromethylnon-4-ene, 1H,1H,7H-perfluorohept-1-ene, 11-(perfluoro-n-octyl)undec-10-en-1-ol, (2H-perfluoropropyl)-2-propenylether, 1,1,1-trifluoro-2-butene and 4,4,4-trifluorobut-2-en-1-ol.

In other example embodiments, Z may be CH$_2$C(R$_4$)COO (R$_5$), wherein R$_4$ represents hydrogen or a methyl group, and R$_5$ is at least one selected from the group consisting of normal or branched alkyl group including 1-20 carbons, t-butyl, iso-norbornyl, 2-methyl-2-adamantyl, 2-ethyl-2-adamantyl, 3-tetrahydrofuranyl, 3-oxocyclohexyl, γ-butyllactone-3-yl, mavaloniclactone, γ-butyro lactone-2-yl, 3-methyl-γ-butyrolactone-3-yl, 2-tetrahydropyranyl, 2-tetrahydrofuranyl, 2,3-propylenecarbonate-1-yl, 1-methoxyethyl, 1-ethoxyethyl, 1-(2-methoxyethoxy)ethyl, 1-(2-acetoxyethoxy)ethyl, t-buthoxycarbonylmethyl, methoxymethyl, ethoxymethyl, trifluoromethyl and α,α,α-trifluoroethyl.

R$_3$ may be at least one selected from the group consisting of deuterium, methyl, ethyl, n-propyl, i-propyl, n-butyl, i-butyl, t-butyl, trifluoromethyl, α,α,α-trifluoroethyl and trideuteriomethyl.

The polymer, in the organic solvent, may include a percentage by weight of 1.0-3.0% of the total weight of the top coating composition.

The organic solvent may be at least one selected from the group consisting of n-propylalcohol, i-propylalcohol, n-butanol, 2-butanol, 3-methyl-2-butanol, n-pentanol, 2-pentanol, 3-methyl-2-pentanol, 4-methyl-2-pentanol, 1-octanol, 2-octanol, 1-decanol, 2-decanol, deuterated-n-propylalcohol-d, deuterated-i-propylalcohol-d, deuterated-n-butanol-d, deuterated-2-butanol-d, deuterated-3-methyl-2-butanol-d, deuterated-n-pentanol-d, deuterated-2-pentanol-d, deuterated-3-methyl-2-pentanol-d, deuterated-4-methyl-2-pentanol-d, deuterated-1-octanol-d, deuterated-2-octanol-d, deuterated-1-decanol-d, deuterated-2-decanol-d, n-heptane, n-octane, n-nonane, n-decane, n-undecane and n-dodecane.

Figure 3:
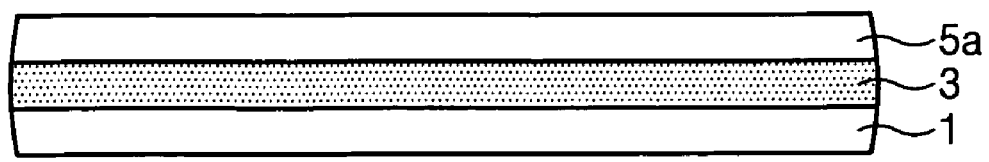

Referring to FIG. 3, a baking process may be performed on the wafer 1 having the top coating composition 5 in order to form a top coating layer 5a. The organic solvent in the top coating composition 5 may be evaporated, leaving the polymer in the top coating layer 5a.

Figure 4:
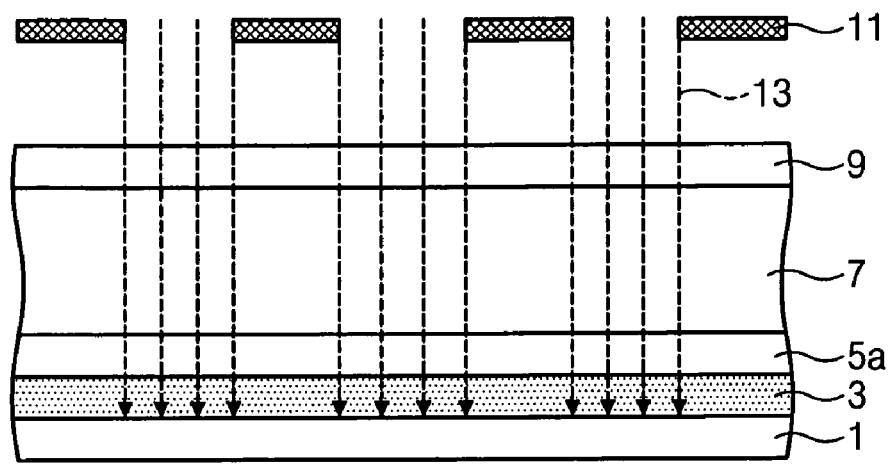
Figure 5:
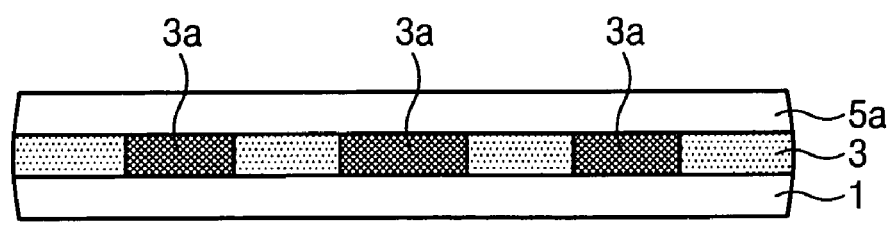

Referring to FIGS. 4 and 5, the wafer 1 having the top coating layer 5a may be loaded into water 7. The polymer may not dissolve in the water 7. The polymer may not dissolve in the photoresist layer 3 due to the deuterated carboxyl group in the polymer. The top coating composition 5 or the layer 5a may be insoluble with the photoresist layer 3. The top coating composition 5 or the layer 5a may protect the photoresist layer 3 from the water 7. An exposure process may be performed using a light 13 transmitted through a photomask 11 and a lens 9. If the photoresist layer 3 is positive-type, then a hardening reaction may occur by using the light 13 in exposed portions of the photoresist layer 3. If the photoresist layer 3 is negative-type, then exposed portions of the photoresist layer 3 may be easily dissolved by a developer without any reaction in the top coating layer 5a.

Figure 6:
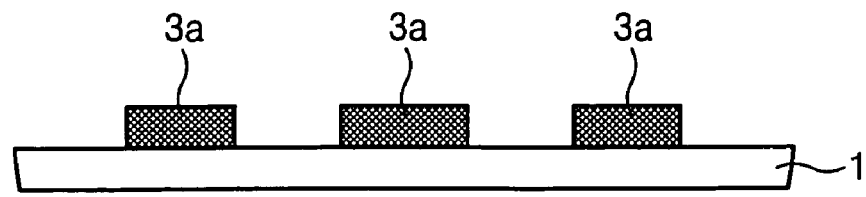

Referring to FIG. 6, the top coating layer 5a and the exposed portions (if negative-type) or unexposed (if positive-type) portions of the photoresist 3 may be removed to form photoresist patterns 3a, after performing the exposure process. The solubility properties of the top coating layer 5a may be increased in a developer due to the deuterated carboxyl group (—COOD) in the polymer.

Experimental Example 1

A. Synthesis of Polymer I Having a Deuterated Carboxyl Group

Methanol-d$_4$(5.0 g) and triethylamine (20 mg) were added to poly(methylvinylether-alt-maleicanhydride) (average molecular weight (MW) of ~216,000, 2.0 g) in 100-ml flask under N$_2$ atmosphere. The mixture was stirred for 6 days at 50° C. The volatile components were removed by evaporation at reduced pressure. The residue was dissolved in anhydrous THF. The solution was added dropwise into an excess amount of hexane. A white precipitate was collected and dried at an ambient temperature under high vacuum, yielding a white solid (Polymer I, 2.36 g).

Methanol-d$_4$ has the following chemical structure:

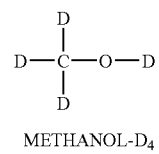

METHANOL-D$_4$

Polymer I has the following chemical structure:

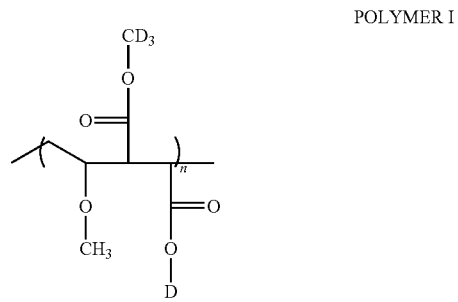

POLYMER I

B. Application of Polymer I as a Top Coating Layer in a Photolithography Process Under Atmospheric Conditions An anti-refractive coating for 193 nm exposing wavelength was spin coated onto an 8-inch bare Si wafer and baked to form an ARC film having a thickness of about 300 angstroms. A photoresist for 193 nm exposing wavelength was spin coated on the wafer and baked at 110° C. for 60 seconds to form a photoresist film having a thickness of about 1800 angstroms.

Polymer I having a deuterated carboxyl group (synthesized as described above) was dissolved in isopropanol and filtered to form a 1 wt % isopropanol solution. The isopropanol solution including the Polymer I was applied on the wafer by spin casting to form a uniform top coating layer and baked at 100° C. for 90 seconds. The solvent, isopropanol, was removed by evaporation, leaving Polymer I.

Figure 7:
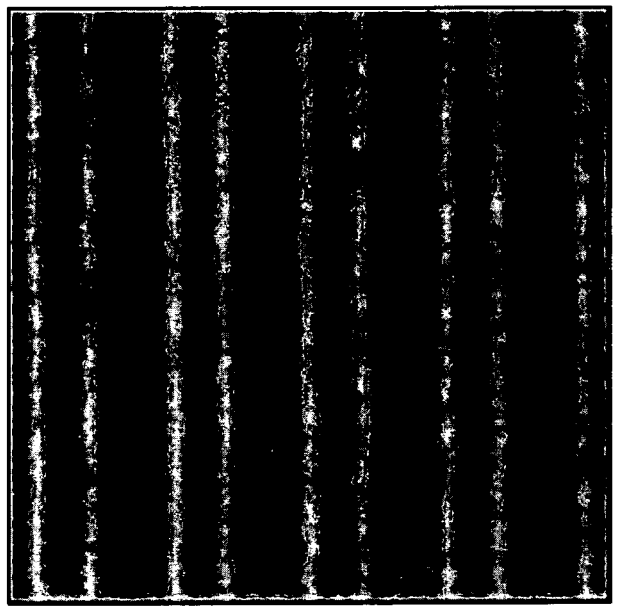

The wafer was exposed using an ArF excimer laser and subjected to a post exposure bake process at 120° C. for 60 seconds. The wafer was developed using a 2.38% tetramethylammonium hydroxide aqueous solution. As shown in FIG. 7, fine line and space patterns (having a pitch of about 180 nm) were obtained.

Figure 8:
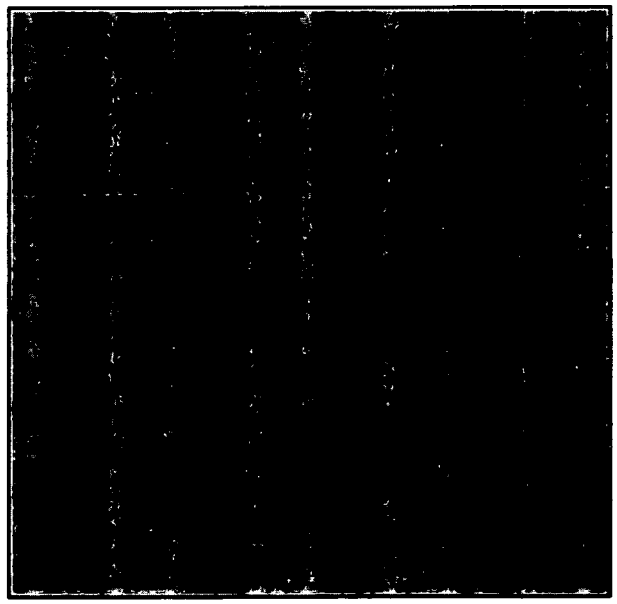

C. Application of Polymer I as a Top Coating Layer in an Immersion Mimic Lithography Process A wafer having a top coating layer was prepared as described above. The wafer was soaked with water for 60 seconds. The wafer was exposed using an ArF excimer laser and soaked again with water for 60 seconds. The soaked wafer was subjected to a post exposure bake process at 120° C. for 60 seconds and developed using a 2.38% tetramethylammonium hydroxide aqueous solution. As shown in FIG. 8, fine line and space patterns (having a pitch of about 180 nm) were obtained.

Experimental Example 2

Control of Experimental Example 1

A. Synthesis of Polymer II Having a Carboxyl Group

Methanol (5.0 g) and triethylamine (20 mg) were added to poly(methylvinylether-alt-maleicanhydride) (Sigma Aldrich, MW ~216,000, 2.0 g) in 100-ml flask under $N_2$ atmosphere. The mixture was stirred for 6 days at 50° C. The volatile components were removed by evaporation at reduced pressure. The residue was dissolved in anhydrous THF. The solution was added dropwise in an excess amount of hexane. A white precipitate was collected and dried at ambient temperature under high vacuum, yielding a white solid (Polymer II, 2.82 g).

Polymer II has the following chemical formula:

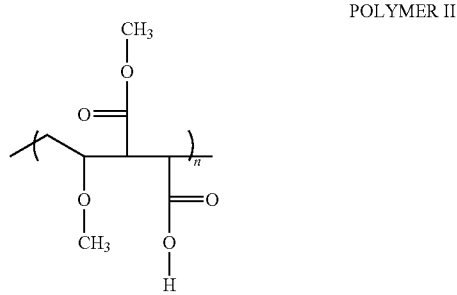

POLYMER II

B. Application of Polymer II as a Top Coating Layer in a Photolithography Process Under Atmospheric Conditions An anti-refractive coating for 193 nm exposing wavelength was spin coated onto an 8-inch bare Si wafer and baked to form an ARC film having a thickness of about 300 angstroms. A photoresist for 193 nm exposing wavelength was spin coated on the wafer and baked at 110° C. for 60 seconds to form a photoresist film having a thickness of about 1800 angstroms.

Polymer II having a carboxyl group (synthesized as described above) was dissolved in isopropanol and filtered to form a 1 wt % isopropanol solution. The isopropanol solution was applied on the wafer by spin casting to form a uniform top coating layer and baked at 100° C. for 90 seconds. The wafer was exposed using an ArF excimer laser. The wafer was subjected to a post exposure bake process performed at 120° C. for 60 seconds and developed using a 2.38% tetramethylammonium hydroxide aqueous solution. No pattern was obtained.

Comparing the Experimental Example 2 to Experimental Example 1, Polymer I includes a deuterated carboxyl group and Polymer II includes a carboxyl group having no deuterium. The deuterated carboxyl group of Polymer I has a lower acidity in order that Polymer I is insoluble in a photoresist or water. As such, if Polymer I is used, then a finer photoresist pattern may be formed. The carboxyl group of Polymer II has a higher acidity to photoresist in order that no photoresist pattern is formed.

Experimental Example 3

A. Synthesis of Polymer III Having a Deuterated Carboxyl Group

1) Synthesis of Precursor Polymer I

Allyl-2,2,2-trifluoroether (1.4 g) and maleicanhydride (0.98 g) in anhydrous THF (2.0 ml) were heated at 50° C. overnight in the presence of AIBN (164 mg) under a $N_2$ atmosphere. The reaction mixture was added dropwise in an excess amount of hexane/isopropanol (4:1). A white precipitate was collected and dried at ambient temperature under high vacuum, yielding a white solid (Precursor Polymer I, 1.57 g).

Precursor Polymer I has the following chemical formula:

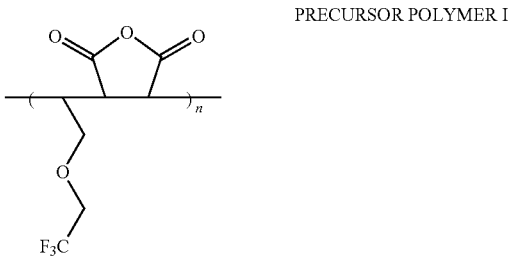

PRECURSOR POLYMER I

2) Ring-Open Reaction of Polymer Precursor I with Deuterated Alcohol

Methanol-$d_4$ (5.0 g) and triethylamine (10 mg) were added to Precursor Polymer I (1.0 g) synthesized above in 100-ml flask under $N_2$ atmosphere. The mixture was stirred for 6 days at 50° C. The volatile components were removed by evaporation at reduced pressure. The residue was dissolved in anhydrous THF. The solution was added dropwise in an excess amount of hexane. A white precipitate was collected and dried at an ambient temperature under high vacuum, yielding a white solid (Polymer III, 0.98 g).

Polymer III has the following chemical formula:

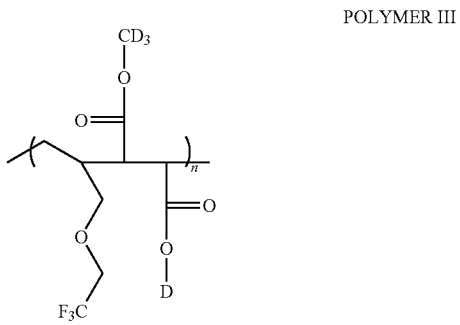

POLYMER III

B. Application of Polymer III as a Top Coating Layer in a Photolithography Process Under Atmospheric Conditions An anti-refractive coating for 193 nm exposing wavelength was spin coated onto an 8-inch bare Si wafer and baked to form an ARC film having a thickness of about 300 angstroms. A photoresist for 193 nm exposing wavelength was spin coated on the wafer and baked at 110° C. for 60 seconds to form a photoresist film having a thickness of about 1800 angstroms.

Polymer III having a deuterated carboxyl group (synthesized as described above) was dissolved in isopropanol and filtered to form a 1 wt % isopropanol solution. The isopropanol solution was applied on the wafer by spin casting to form a uniform top coating layer and baked at 100° C. for 90 seconds. The solvent, isopropanol, was removed by evaporation, leaving Polymer III.

Figure 9:
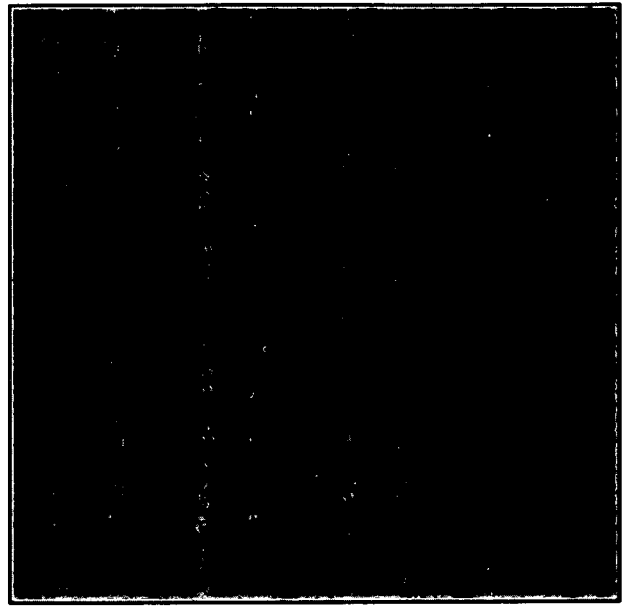

The wafer was exposed using an ArF excimer laser and subjected to a post exposure bake process at 120° C. for 60 seconds. The wafer was developed using a 2.38% tetramethylammonium hydroxide aqueous solution. As shown in FIG. 9, fine line and space patterns (having a pitch of about 180 nm) were obtained.

Figure 10:
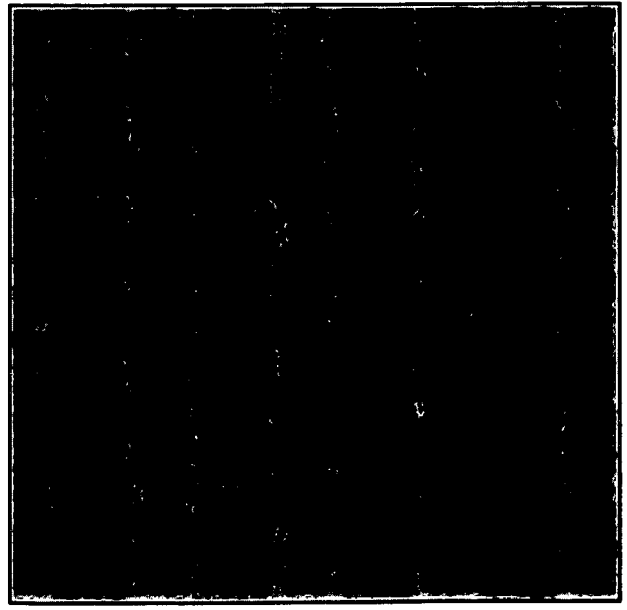

C. Application of Polymer III as a Top Coating Layer in an Immersion Mimic Lithography Process A wafer having a top coating layer was prepared as described above. The wafer was soaked with water for 60 seconds. The wafer was exposed using an ArF excimer laser and soaked again with water for 60 seconds. The wafer was subjected to a post exposure bake process at 120° C. for 60 seconds and developed using a 2.38% tetramethylammonium hydroxide aqueous solution. As shown in FIG. 10, fine line and space patterns (having a pitch of about 180 nm) were obtained.

Experimental Example 4

A. Synthesis of Polymer IV having a Deuterated Carboxyl Group

1) Synthesis of Precursor Polymer II

Allylalcohol (0.58 g), 3,4-dihydropyran (0.84 g), and maleicanhydride (1.96 g) in anhydrous THF (5.0 ml) were heated at 50° C. for overnight in the presence of AIBN (328 mg) under $N_2$ atmosphere. The reaction mixture was added dropwise in an excess amount of isopropanol. A white precipitate was collected and dried at ambient temperature under high vacuum, yielding a white solid (Precursor Polymer II, 2.71 g).

Precursor Polymer II has the following chemical formula:

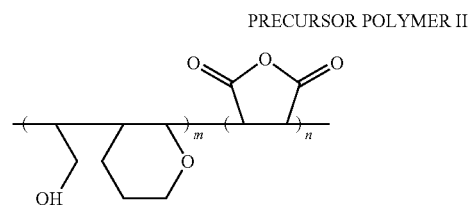

PRECURSOR POLYMER II

2) Ring-Open Reaction of Polymer Precursor II with Deuterated Alcohol

Methanol-$d_4$ (5.0 g) and triethylamine (10 mg) were added to Precursor Polymer (1.0 g) synthesized above in 100-ml flask under $N_2$ atmosphere. The mixture was stirred for 7 days at 50° C. The volatile components were removed by evaporation under vacuum. The residue was dissolved in anhydrous THF. The solution was added dropwise in an excess amount of hexane. A white precipitate was collected and dried at ambient temperature under high vacuum, yielding a white solid (Polymer IV, 1.02 g).

Polymer IV has the following chemical formula:

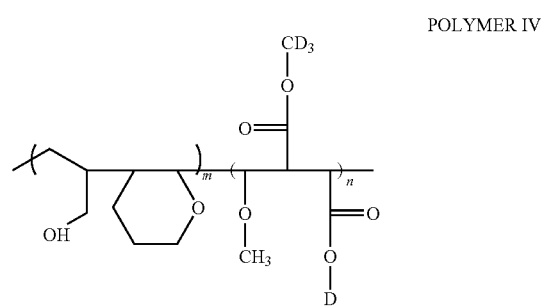

POLYMER IV

B. Application of Polymer IV as a Top Coating Layer in an Immersion Mimic Lithography Process An anti-refractive coating for 193 nm exposing wavelength was spin coated onto an 8-inch bare Si wafer and baked to form an ARC film having a thickness of about 300 angstroms. A photoresist for 193 nm exposing wavelength was spin coated on the wafer and baked at 110° C. for 60 seconds to form a photoresist film having a thickness of about 1800 angstroms.

Polymer IV having a deuterated carboxyl group (synthesized as described above) was dissolved in isopropanol and filtered to form a 1 wt % isopropanol solution. The isopropanol solution was applied on the wafer by spin casting to form a uniform top coating layer and baked at 100° C. for 90 seconds.

Figure 11:
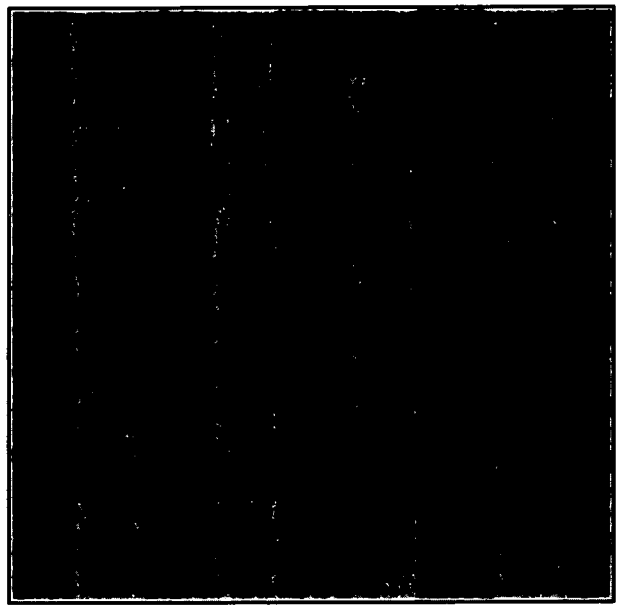

The wafer was soaked with water for 60 seconds. The wafer was exposed using an ArF excimer laser and soaked again with water for 60 seconds. The wafer was subjected to a post exposure bake process at 120° C. for 60 seconds and developed using a 2.38% tetramethylammonium hydroxide aqueous solution. As shown in FIG. 11, fine line and space patterns (having a pitch of about 180 nm) were obtained.

Experimental Example 5

A. Synthesis of a Polymer V having a Deuterated Carboxyl Group

Deuterated water (5.0 g) and triethylamine (20 mg) were added to poly(methylvinylether-alt-maleicanhydride) (Sigma Aldrich, Mw ~216000, 2.0 g) in 100-ml flask under $N_2$ atmosphere. The mixture was stirred for 7 days at 50° C. The volatile components were removed by evaporation at reduced pressure. The residue was dissolved in anhydrous THF. The solution was added dropwise in an excess amount of hexane. A white precipitate was collected and dried at ambient temperature under high vacuum, yielding a white solid (Polymer V, 1.11 g).

Polymer V has the following chemical formula:

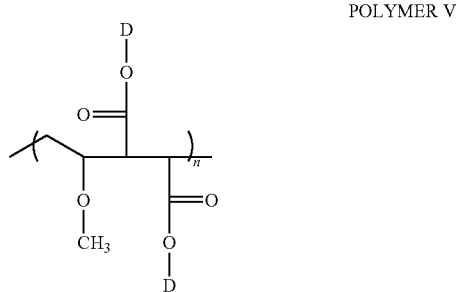

POLYMER V

B. Application of Polymer V as a Top Coating Layer in a Photolithography Process Under Atmospheric Conditions An anti-refractive coating for 193 nm exposing wavelength was spin coated onto an 8-inch bare Si wafer and baked to form an ARC film having a thickness of about 300 angstroms. A photoresist for 193 nm exposing wavelength was spin coated on the wafer and baked at 110° C. for 60 seconds to form a photoresist film having a thickness of about 1800 angstroms.

Polymer V having a deuterated carboxyl group (synthesized as described above) was dissolved in isopropanol and filtered, forming a 1 wt % isopropanol solution. The isopropanol solution was applied on the wafer by spin casting to form a uniform top coating layer and baked at 100° C. for 90 seconds. The isopropanol was removed by evaporation, leaving Polymer V.

Figure 12:
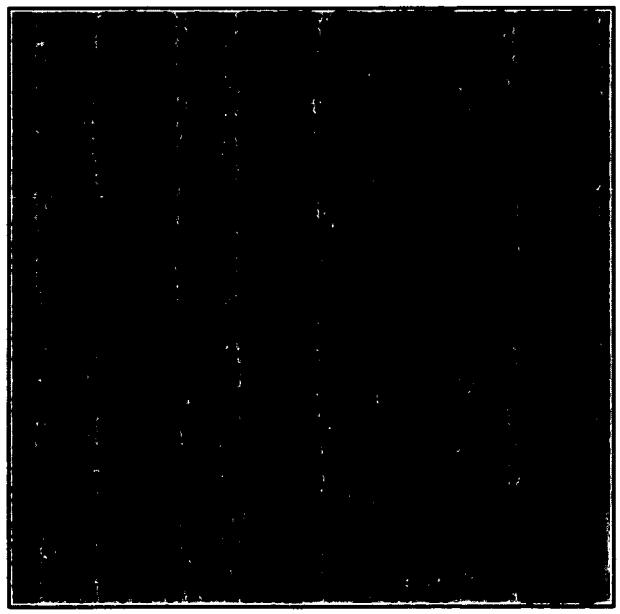

The wafer was exposed using an ArF excimer laser. The wafer was subjected to a post exposure bake process at 120° C. for 60 seconds and developed using a 2.38% tetramethylammonium hydroxide aqueous solution. As shown in FIG. 12, fine line and space (having a pitch of about 180 nm) were obtained.

Experimental Example 6

A. Synthesis of a Polymer VI Having a Deuterated Carboxyl Group

1) Synthesis of Precursor Polymer III

Allyl butyl ether (1.14 g) and maleicanhydride (0.98 g) in anhydrous THF (5.0 ml) were heated at 60° C. for overnight in the presence of AIBN (164 mg) under $N_2$ atmosphere. The reaction mixture was added dropwise into an excess amount of hexane. A pale yellow precipitate was collected and dried at ambient temperature under high vacuum, yielding a pale yellow solid (Precursor Polymer III, 1.57 g).

Precursor Polymer III has the following chemical formula:

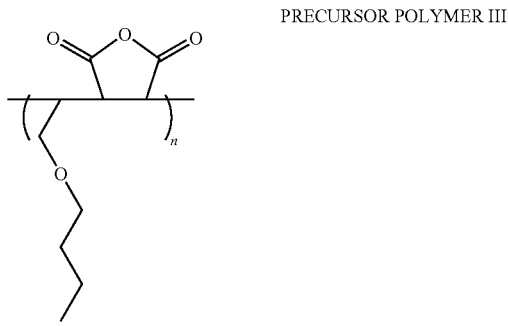

PRECURSOR POLYMER III

2) Ring-Open Reaction of Polymer Precursor III with Deuterated Alcohol

Methanol-$d_4$ (5.0 g) and triethylamine (10 mg) were added to Precursor Polymer III (1.0 g) synthesized above in 100-ml flask under $N_2$ atmosphere. The mixture was stirred for 7 days at 60° C. The volatile components were removed by evaporation under vacuum. The residue was dissolved in anhydrous THF. The solution was added dropwise in an excess amount of hexane. A white precipitate was collected and dried at ambient temperature under high vacuum, yielding a white solid (Polymer VI, 1.0 g).

Polymer VI has the following chemical formula:

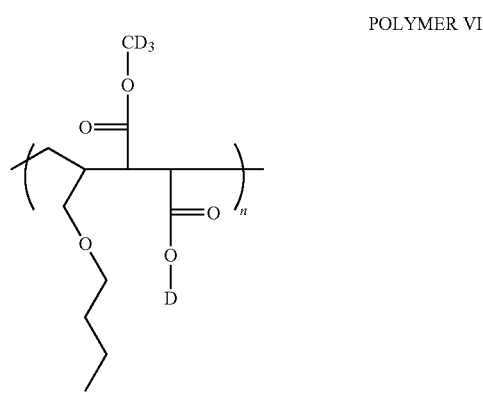

POLYMER VI

B. Application of Polymer VI as a Top Coating Layer in a Photolithography Process Under Atmospheric Pressure An anti-refractive coating for 193 nm exposing wavelength was spin coated onto an 8-inch bare Si wafer and baked to form an ARC film having a thickness of about 300 angstrom. A photoresist for 193 nm exposing wavelength was spin coated on the wafer and baked at 110° C. for 60 seconds to form a photoresist film having a thickness of about 1800 angstroms.

Polymer VI having a deuterated carboxyl group (synthesized as described above) was dissolved in 4-methyl-2-pentanol and filtered, forming a 1 wt % 4-methyl-2-pentanol solution. The isopropanol solution was applied on the wafer by spin casting to form a uniform top coating layer and baked at 100° C. for 90 seconds. The solvent, 4-methyl-2-pentanol, was evaporated with Polymer VI remaining.

Figure 13:
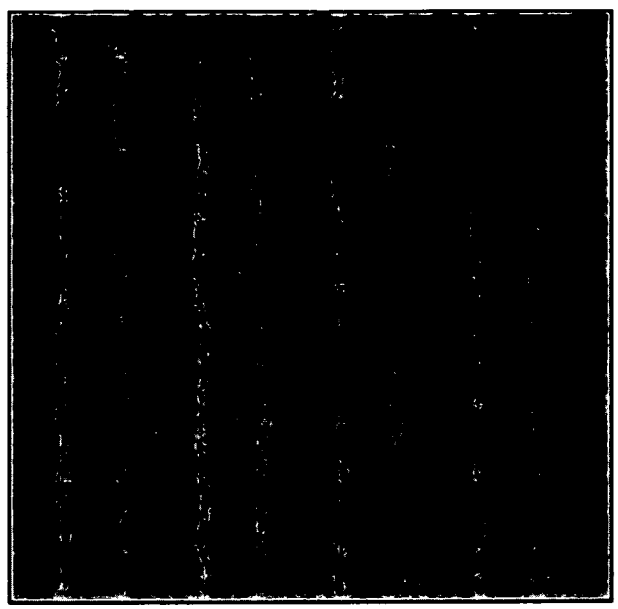
Figure 14:
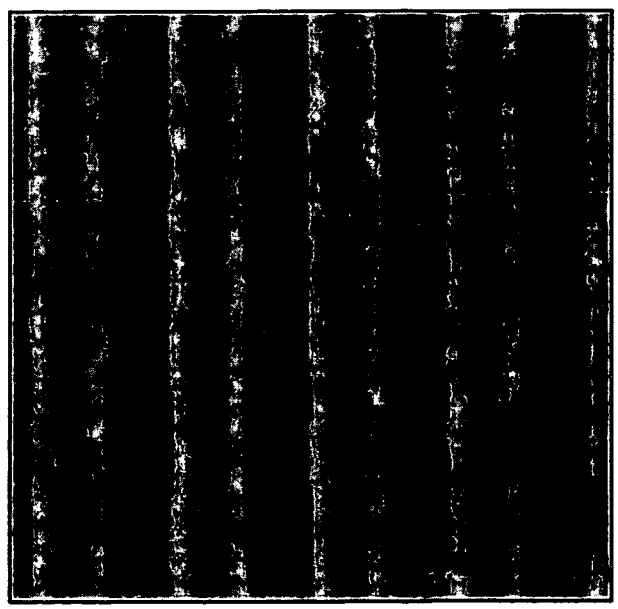

The wafer was exposed using an ArF excimer laser and subjected to a post exposure bake process at 120° C. for 60 seconds and developed using a 2.38% tetramethylammonium hydroxide aqueous solution. As shown in FIG. 13, fine line and space patterns (having a pitch of about 180 nm) were obtained.

C. Application of Polymer VI as a Top Coating Layer in an Immersion Mimic Lithography Process A wafer having a top coating layer was prepared as described above. The wafer was soaked with water for 60 seconds before exposure. The wafer was exposed using an ArF excimer laser and soaked again with water for 60 seconds. The wafer was subjected to a post exposure bake process at 120° C. for 60 seconds and developed in a 2.38% tetramethylammonium hydroxide aqueous solution. As shown in FIG. 14, fine line and space pattern (having a pitch of about 180 nm) were obtained.

Experimental Example 7

A. Synthesis of Polymer VII Having a Deuterated Carboxyl Group

1) Synthesis of Precursor Polymer IV

1-Octene (1.12 g) and maleicanhydride (0.98 g) in anhydrous THF (5.0 ml) were heated at 60° C. overnight in the presence of AIBN (164 mg) under $N_2$ atmosphere. The reaction mixture was added dropwise in an excess amount of hexane. A white precipitate was collected and dried at ambient temperature under high vacuum, yielding a white solid (Precursor Polymer IV, 1.79 g).

Precursor Polymer IV has the following chemical formula:

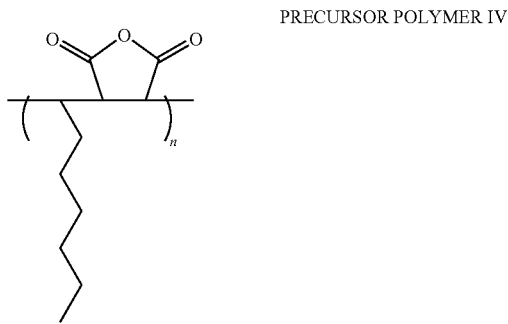

PRECURSOR POLYMER IV

2) Ring-Open Reaction of Polymer Precursor IV with Deuterated Alcohol

Methanol-$d_4$ (5.0 g) and triethylamine (10 mg) were added to Precursor Polymer IV (1.0 g) synthesized above in 100-ml flask under $N_2$ atmosphere. The mixture was stirred for 8 days at 60° C. The volatile components were removed by evaporation under vacuum. The residue was dissolved in anhydrous THF. The solution was added dropwise into an excess amount of hexane. A white precipitate was collected and dried at ambient temperature under high vacuum, yielding a pale pink solid (Polymer VII, 0.799 g).

Polymer VII has the following chemical formula:

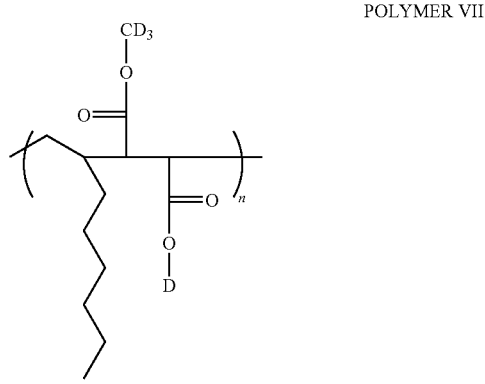

POLYMER VII

B. Application of Polymer VII as a Top Coating Layer in a Photolithography Process Under Atmospheric Conditions An anti-refractive coating for 193 nm exposing wavelength was spin coated onto an 8-inch bare Si wafer and baked to form an ARC film having a thickness of about 300 angstroms. A photoresist for 193 nm exposing wavelength was spin coated on the wafer and baked at 110° C. for 60 seconds to form a photoresist film having a thickness of about 1800 angstroms.

Polymer VII having a deuterated carboxyl group (synthesized as described above) was dissolved in 4-methyl-2-pentanol and filtered, forming a 1 wt % 4-methyl-2-pentanol solution. The solution was applied onto the wafer by spin casting to form a uniform top coating layer and baked at 100° C. for 90 seconds. The 4-methyl-2-pentanol was evaporated, leaving Polymer VII.

Figure 15:
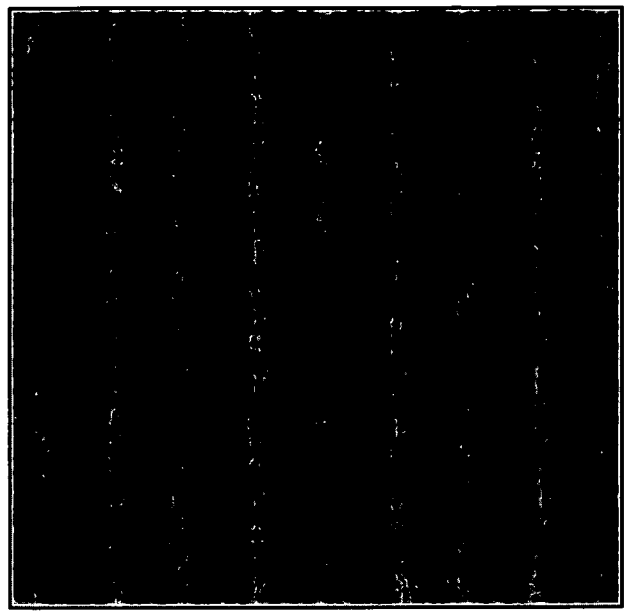

The wafer was exposed using an ArF excimer laser. The wafer subjected to a post exposure bake process at 120° C. for 60 seconds and developed using a 2.38% tetramethylammonium hydroxide aqueous solution. As shown in FIG. 15, fine line and space patterns (having a pitch of about 180 nm) were obtained.

Figure 16:
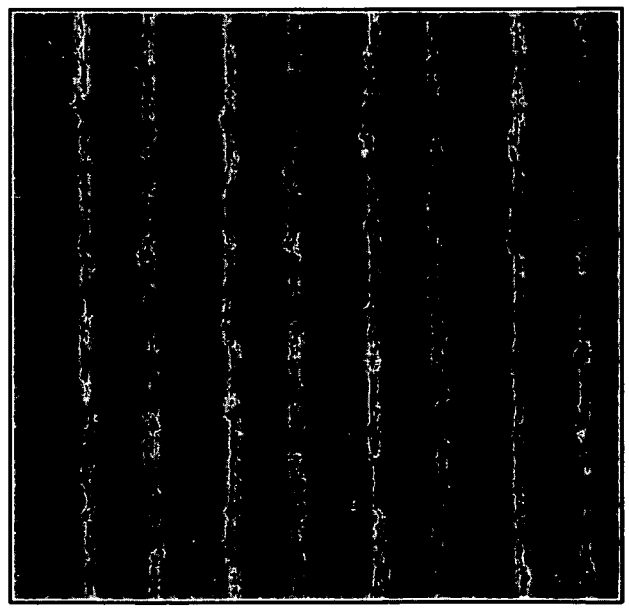

C. Application of Polymer VII as a Top Coating Layer in an Immersion Mimic Lithography Process A wafer having a top coating layer was prepared as described above. The wafer was soaked with water for 60 seconds before exposure. The wafer was exposed using an ArF excimer laser and soaked again with water for 60 seconds. The wafer was subjected to a post exposure bake process at 120° C. for 60 seconds and developed using a 2.38% tetramethylammonium hydroxide aqueous solution. As shown in FIG. 16, fine line and space patterns (having a pitch of about 180 nm) were obtained.

Experimental Example 8

A. Synthesis of Polymer VIII Having a Deuterated Carboxyl Group

1) Synthesis of Precursor Polymer V

Allyl trimethylsilyl ether (1.14 g) and maleicanhydride (0.98 g) in anhydrous THF (5.0 ml) were heated at 60° C. overnight in the presence of AIBN (164 mg) under $N_2$ atmosphere. The reaction mixture was added dropwise in an excess amount of hexane. A yellow precipitate was collected and dried at ambient temperature under high vacuum, yielding a pale yellow solid (Precursor Polymer V, 1.82 g).

Precursor Polymer V has the following chemical formula:

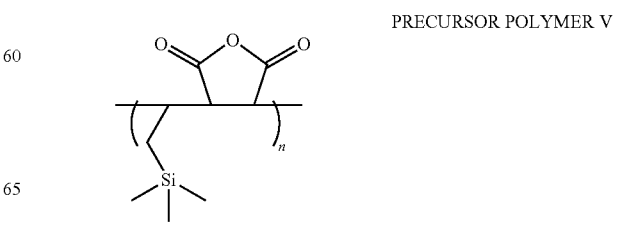

PRECURSOR POLYMER V

2) Ring-Open Reaction of Polymer Precursor V with Deuterated Alcohol

Methanol-d₄ (5.0 g) and triethylamine (10 mg) were added to Precursor Polymer V (1.0 g) synthesized above in 100-ml flask under N₂ atmosphere. The mixture was stirred for 8 days at 60° C. The volatile components were removed by evaporation under vacuum. The residue was dissolved in anhydrous THF. The solution was added dropwise in an excess amount of hexane. A white precipitate was collected and dried at ambient temperature under high vacuum, yielding a white solid (Polymer VIII, 0.844 g).

Polymer VIII has the following chemical formula:

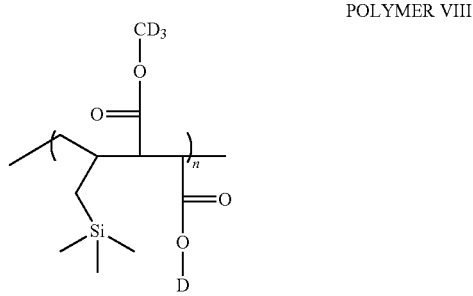

POLYMER VIII

B. Application of Polymer VIII as a Top Coating Layer in a Photolithography Process Under Atmospheric Conditions An anti-refractive coating for 193 nm exposing wavelength was spin coated onto an 8-inch bare Si wafer and baked to form an ARC film having a thickness of about 300 angstroms. A photoresist for 193 nm exposing wavelength was spin coated on the wafer and baked at 110° C. for 60 seconds to form a photoresist film having a thickness of about 1800 angstroms.

Polymer VIII having a deuterated carboxyl group (synthesized as described above) was dissolved in 4-methyl-2-pentanol and filtered, forming a 1 wt % 4-methyl-2-pentanol solution. The solution was applied onto the wafer by spin casting to form a uniform top coating layer and baked at 100° C. for 90 seconds. The 4-methyl-2-pentanol was evaporated, leaving Polymer VIII.

Figure 17:
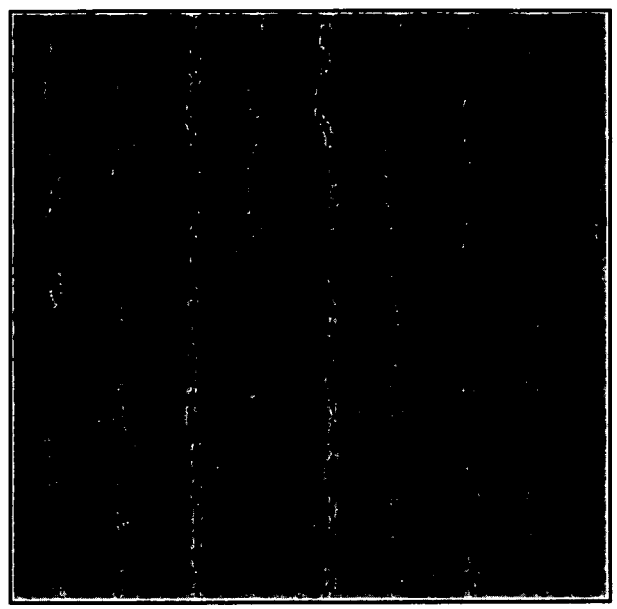

The wafer was exposed using an ArF excimer laser. The wafer subjected to a post exposure bake process at 120° C. for 60 seconds and developed using a 2.38% tetramethylammonium hydroxide aqueous solution. As shown in FIG. 17, fine line and space patterns (having a pitch of about 180 nm) were obtained.

Figure 18:
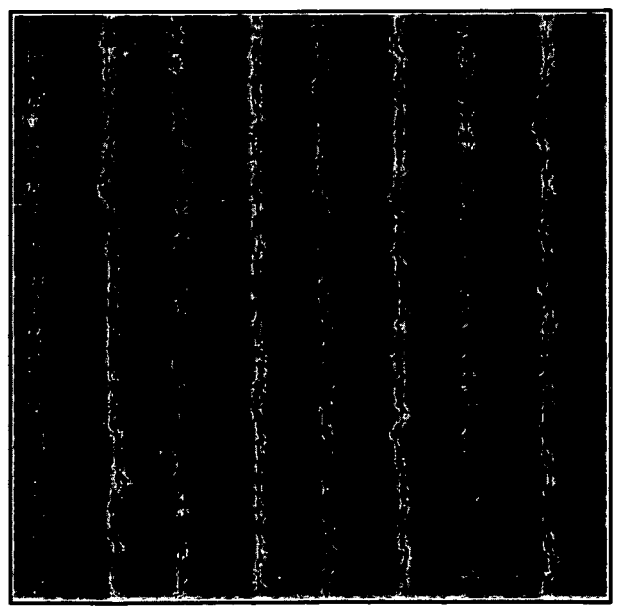

C. Application of Polymer VIII as a Top Coating Layer in an Immersion Mimic Lithography Process A wafer having a top coating layer was prepared as described. The wafer was soaked with water for 60 seconds before exposure. The wafer was exposed using an ArF excimer laser and soaked again with water for 60 seconds. The wafer was subjected to a post exposure bake process at 120° C. for 60 seconds and developed using a 2.38% tetramethylammonium hydroxide aqueous solution. As shown in FIG. 18, fine line and space patterns (having a pitch of about 180 nm) were obtained.

Experimental Example 9

A. Synthesis of a Polymer IX Having a Deuterated Carboxyl Group

1) Synthesis of Deuterated Methacryl Acid (CH₂=CH(CH₃)COOD)

BuLi (2.5M hexane solution, 40 ml) was added to methacryl acid (8.61 g) in THF (5 ml) dropwise with toluene/liquid N₂ bath (−93° C.) under N₂ atmosphere. The reaction mixture was gradually raised to ambient temperature. Deuterated hydrochloric acid (DCl)/Deuterated water (D₂O) (35 wt %, 10 g) was added dropwise to the reaction mixture and stirred at ambient temperature. Ether (20 ml) was added. The organic layer was collected. The aqueous layer was washed with ether (10 ml) and the organic layer was extracted. The extraction was repeated. The organic layers were combined and dried over anhydrous MgSO₄. The volatile components were removed by distillation at less than 70° C. Bulb-to-bulb-distillation was performed under reduced pressure, yielding deuterated methacryl acid (1.77 g). The deuterated ratio of a carboxylic acid hydrogen based on 1H-NMR spectroscopy was 72%.

Deuterated methacryl acid has the following chemical formula:

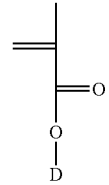

DEUTERATED METHACRYL ACID

2) Synthesis of Deuterated Methacrylate Copolymer (Polymer IX)

Deuterated methacryl acid (348 mg) (synthesized above) and t-butyl methacrylate (142 mg) in anhydrous THF (5.0 ml) were heated at 60° C. overnight in the presence of AIBN (41 mg) under N₂ atmosphere. The reaction mixture was added dropwise in an excess amount of hexane. A white precipitate was collected and dried at ambient temperature under high vacuum, yielding a white powder (Polymer IX, 0.406 g).

Polymer IX has the following chemical formula:

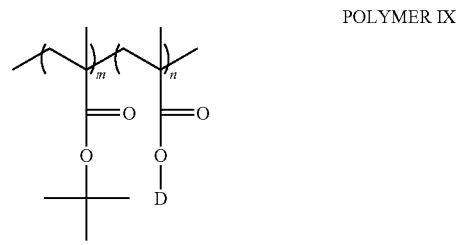

POLYMER IX

B. Application of Polymer IX as a Top Coating Layer in a Photolithography Process Under Atmospheric Conditions An anti-refractive coating for 193 nm exposing wavelength was spin coated onto an 8-inch bare Si wafer and baked to form an ARC film having a thickness of about 300 angstroms. A photoresist for 193 nm exposing wavelength was spin coated on the wafer and baked at 110° C. for 60 seconds to form a photoresist film having a thickness of about 1800 angstroms.

Polymer IX having a deuterated carboxyl group (synthesized as described above) was dissolved in isopropanol and filtered, forming a 1 wt % isopropanol solution. The isopropanol solution was applied on the wafer by spin casting to form a uniform top coating layer and baked at 100° C. for 90 seconds. The isopropanol was removed by evaporation, leaving Polymer IX.

Figure 19:
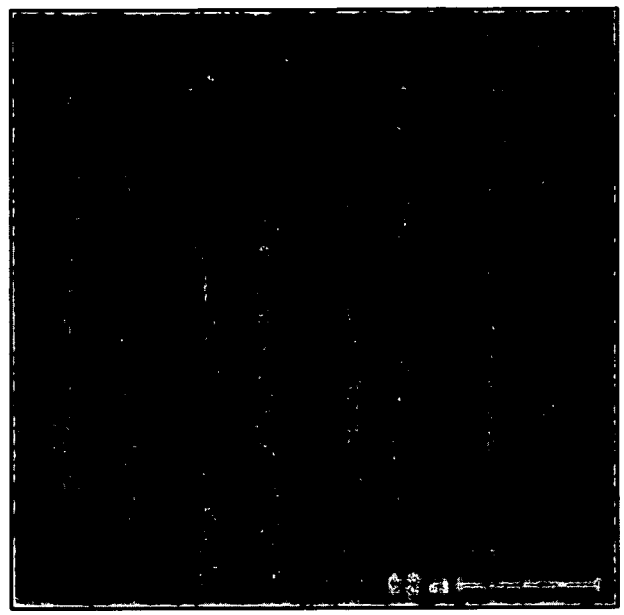

The wafer was exposed using an ArF excimer laser. The wafer was subjected to a post exposure bake process at 120° C. for 60 seconds and developed using a 2.38% tetramethylammonium hydroxide aqueous solution. As shown in FIG. 19, fine line and space patterns (having a pitch of about 180 nm) were obtained. The fine line and space pattern were slightly bridged.

Experimental Example 10

Control of Experimental Example 9

A. Synthesis of Polymer X Having a Carboxyl Group

Methacryl acid (1.38 g) and t-butyl methacrylate (0.57 g) in anhydrous THF (13 ml) were heated at 60° C. overnight in the presence of V601 (460 mg) under $N_2$ atmosphere. The reaction mixture was added dropwise in an excess amount of hexane. A white precipitate was collected and dried at ambient temperature under high vacuum, yielding a white powder (Polymer X, 1.9 g).

Polymer X has the following chemical formula:

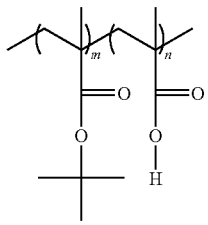

POLYMER X

B. Application of Polymer X as a Top Coating Layer in a Photolithography Process Under Atmospheric Conditions An anti-refractive coating for 193 nm exposing wavelength was spin coated onto an 8-inch bare Si wafer and baked to form an ARC film having a thickness of about 300 angstrom. A photoresist for 193 nm exposing wavelength was spin coated on the wafer and baked at 110° C. for 60 seconds to form a photoresist film having a thickness of about 1800 angstrom.

Polymer X having a deuterated carboxyl group (synthesized as described above) was dissolved in isopropanol and filtered, forming a 1 wt % isopropanol solution. The isopropanol solution was applied onto the wafer by spin casting to form a uniform top coating layer and baked at 100° C. for 90 seconds.

Figure 20:

The wafer was exposed using an ArF excimer laser. The wafer was subjected to a post exposure bake process at 120° C. for 60 seconds and developed using a 2.38% tetramethylammonium hydroxide aqueous solution. As shown in FIG. 20, no pattern was obtained.

Experimental Example 11

A. Synthesis of Polymer XI Having a Deuterated Carboxyl Group

1) Synthesis of Deuterated Methacrylate Copolymer (Polymer XI)

Deuterated methacryl acid (49 mg) and methyl methacrylate (56 mg) in anhydrous THF (2.0 ml) were heated at 60° C. overnight in the presence of AIBN (3.0 mg) under $N_2$ atmosphere. The reaction mixture was added dropwise in an excess amount of hexane. A white precipitate was collected and dried at ambient temperature under high vacuum, yielding a white powder (Polymer XI, 44 mg).

Polymer XI has the following chemical formula:

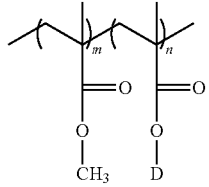

POLYMER XI

B. Application of Polymer XI as a Top Coating Layer in a Photolithography Process Under Atmospheric Conditions An anti-refractive coating for 193 nm exposing wavelength was spin coated onto an 8-inch bare Si wafer and baked to form an ARC film having about 300 angstroms thickness. A photoresist for 193 nm exposing wavelength was spin coated on a wafer and baked at 110° C. for 60 seconds to form a photoresist film having a thickness of 1800 angstroms.

Polymer XI having a deuterated carboxyl group (synthesized as described above) was dissolved in isopropanol and filtered, forming a 1 wt % isopropanol solution. The ispropanol solution was applied on the wafer by spin casting to form a uniform top coating layer and baked at 100° C. for 90 seconds. The isopropanol was removed by evaporation, Polymer XI.

Figure 21:
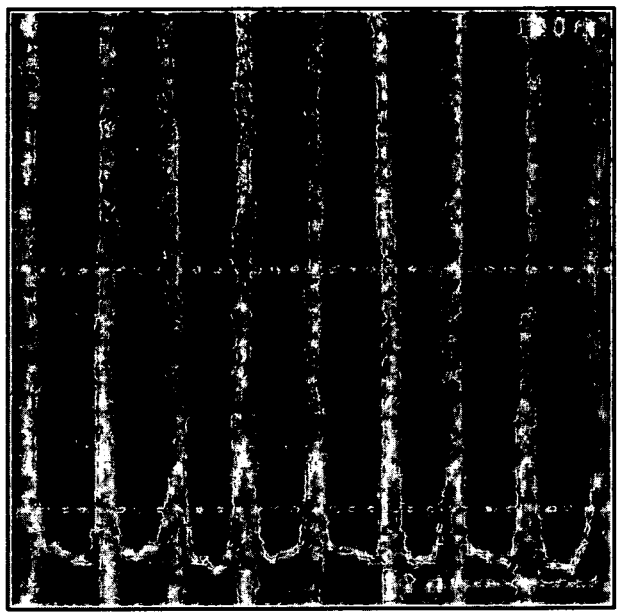

The wafer was exposed using an ArF excimer laser. The wafer was subjected to a post exposure bake process at 120° C. for 60 seconds and developed using a 2.38% tetramethylammonium hydroxide aqueous solution. As shown in FIG. 21, fine line and space patterns (having a pitch of about 180 nm) were obtained.

Experimental Example 12

Control of Experimental Example 11

A. Synthesis of Polymer XII Having a Carboxyl Group

Methacryl acid (258 mg) and methyl methacrylate (300 mg) in anhydrous THF (5 ml) were heated at 60° C. for overnight in the presence of AIBN (20 mg) under $N_2$ atmosphere. The reaction mixture was added dropwise in an excess amount of hexane. A white precipitate was collected and dried at ambient temperature under high vacuum, yielding a white powder (Polymer XII, 0.213 g).

Polymer XII has the following chemical formula:

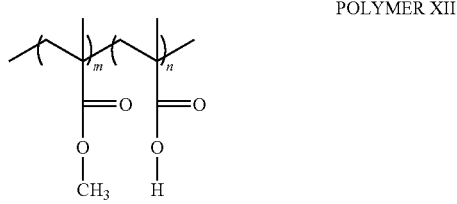

POLYMER XII

B. Application of Polymer XII as a Top Coating Layer in a Photolithography Process Under Atmospheric Conditions An anti-refractive coating for 193 nm exposing wavelength was spin coated onto an 8-inch bare Si wafer and baked to form an ARC film having a thickness of about 300 angstroms. A photoresist for 193 nm exposing wavelength was spin coated on a wafer and baked at 110° C. for 60 seconds to form a photoresist film having a thickness of about 1800 angstroms.

Figure 22:
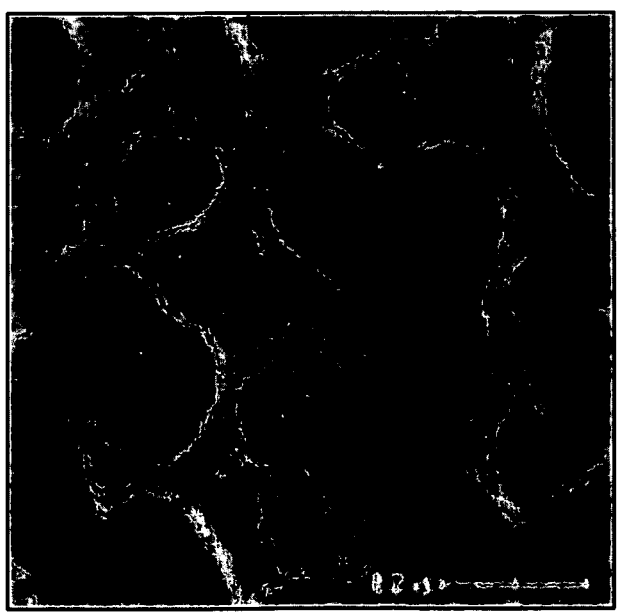

Polymer XII having a deuterated carboxyl group (synthesized as described above) was dissolved in isopropanol and filtered, forming a 1 wt % isopropanol solution. The isopropanol solution was applied on the wafer by spin casting to form a uniform top coating layer and baked at 100° C. for 90 seconds. The wafer was exposed using an ArF excimer laser. The wafer was subjected to a post exposure bake process at 120° C. for 60 seconds and developed using a 2.38% tetramethylammonium hydroxide aqueous solution. As shown in FIG. 22, no pattern was obtained.

In the immersion mimic lithography process of Experimental Examples 1, 3, 6, 7 and 8, real immersion lithography equipment was not used. In order to recreate the same condition that would result from using real immersion lithography equipment in an immersion lithography process, top coating layers are wetted (or soaked) with deionized water using a deionized water rinse process. An exposure process was performed. As such, the top coating layers according to example embodiments may have the same (or similar) effectiveness when used in a real immersion lithography process.

Because the polymer for the top coating layer according example embodiments includes a deuterated carboxyl group, the polymer may have a desired acidity making the polymer insoluble with water and photoresist and soluble in a developer. As such, it is possible to achieve a finer and more exact patterning in an immersion lithography process using the polymer.

The foregoing is illustrative of example embodiments and is not to be construed as limiting thereof. Although a few example embodiments have been described, those skilled in the art will readily appreciate that many modifications are possible in example embodiments without materially departing from the novel teachings and advantages of the present invention. Accordingly, all such modifications are intended to be included within the scope of this invention as defined in the claims. In the claims, means-plus-function clauses are intended to cover the structures described herein as performing the recited function, and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The present invention is defined by the following claims, with equivalents of the claims to be included therein.

What is claimed is:

1. A polymer, comprising:

Chemical Structure (1), including a first monomer (Z) and a second monomer $—C_3O_2R_1R_2D$ having a deuterated carboxyl group, represented by

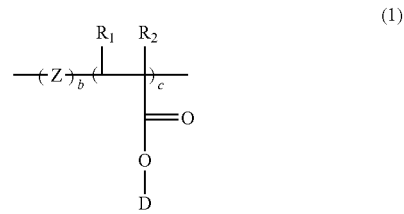

(1)

wherein $R_1$ represents hydrogen or $—COOR_3$, $R_3$ represents at least one selected from the group consisting of deuterium, a deuterated or hydrogenated normal alkyl group including 1-20 carbons and a deuterated or hydrogenated branched alkyl group including 1-20 carbons, $R_2$ represents hydrogen or a methyl group, Z represents at least one selected from the group consisting of a vinyl monomer, an allyl monomer and an acrylate monomer, and an average molecular weight of the polymer is 1,000-100,000.

2. The polymer according to claim 1, wherein the expression b+c=1 is satisfied.

3. The polymer according to claim 1, wherein Z represents at least one selected from the group consisting of vinylalcohol, methylvinylether, ethylvinylether, 3,4-dihydropyran, 2,3-dihydrofuran, trimethylvinylsilane, triethylvinylsilane, allyl-2,2,2-trifluoroether, allylalcohol, allylethylether, allyl-n-propylether, allyltrimethylsilane, heptafluoro-3,3-bis(trifluoromethyl)-1-hexane, 1H,1H,2H-heptafluoropent-1-ene, 3,3,4,4,4-Pentafluorobutene, 1H,1H,2H-perfluoro-1-decene, 1H,1H,2H-perfluoro-1-dodecene, 1H,1H,2H-perfluoro-1-hexene, 3-(perfluoro-n-hexyl)prop-2-en-1-ol, 11-(perfluoro-n-hexyl)undec-10-en-1-ol, 1H,1H,2H-perfluoro-1-octene, (3-perfluoro-n-octyl)prop-2-enol, 11-(perfluoro-n-octyl)undec-10-en-1-ol, (2H-perfluoropropyl)-2-propenylether, 1,1,1-trifluoro-2-butene, 4,4,4-trifluorobut-2-en-1-ol, 2-(trifluoromethyl)propene, 3,3,3-trifluoropropene, 4,5,5,6,6,6-hexafluoro-4-(trifluoromethyl)-hex-2-ene, 4,5,5,6,6,6-hexafluoro-3-(trimethyl)-hex-2-en-1-ol, 1,1,1,2,2,3-hexafluoro-3-trifluoromethylnon-4-ene, 1H,1H,7H-perfluorohept-1-ene, 11-(perfluoro-n-octyl)undec-10-en-1-ol, (2H-perfluoropropyl)-2-propenylether and 1,1,1-trifluoro-2-butene, 4,4,4-trifluorobut-2-en-1-ol.

4. The polymer according to claim 1, wherein the Z is $CH_2C(R_4COO(R_5)$, wherein $R_4$ represents hydrogen or a methyl group, and R₅ represents at least one selected from the group consisting of a normal or branched alkyl group including 1-20 carbons, t-butyl, isonorbornyl, 2-methyl-2-adamantyl, 2-ethyl-2-adamantyl, 3-tetrahydrofuranyl, 3-oxocyclohexyl, γ-butyllactone-3-yl, mavalomclactone, γ-butyro lactone-2-yl, 3-methyl-γ-butyrolactone-3-yl, 2-tetrahydropyranyl, 2-tetrahydrofuranyl, 2,3-propylenecarbonate-1-yl, 1-methoxyethyl, 1-ethoxyethyl, 1-(2-methoxyethoxy)ethyl, 1-(2-acetoxyethoxy)ethyl, t-buthoxycarbonylmethyl, methoxymethyl, ethoxymethyl, trifluoromethyl and α,α,α-trifluoroethyl.

5. The polymer according to claim 1, wherein the $R_3$ represents at least one selected from the group consisting of methyl, ethyl, n-propyl, i-propyl, n-butyl, i-butyl, t-butyl, trifluoromethyl, α,α,α-trifluoroethyl and trideuteriomethyl.

6. The polymer according to claim 1, wherein $R_1$ is —COOR₃ and $R_2$ is hydrogen, forming the polymer having Chemical Structure (2).

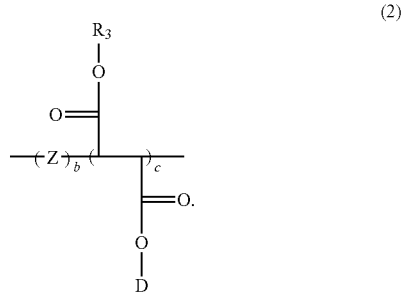

(2)

7. The polymer according to claim 6, further comprising a third monomer (X), forming the polymer having Chemical Structure (3),

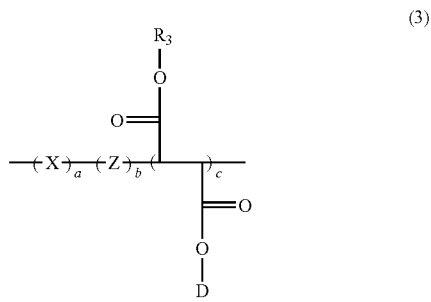

(3)

wherein X represents at least one selected from the group consisting of a vinyl monomer and an allyl monomer.

8. The polymer according to claim 7, wherein the expression a+b+c=1 is satisfied.

9. The polymer according to claim 7, wherein X represents at least one selected from the group consisting of vinylalcohol, methylvinylether, ethylvinylether, 3,4-dihydropyran, 2,3-dihydrofuran, trimethylvinylsilane, triethylvinylsilane, allyl-2,2,2-trifluoroether, allylalcohol, allylethylether, allyl-n-propylether, allyltrimethylsilane, heptafluoro-3,3-bis(trifluoromethyl)-1-hexane, 1H,1H,2H-heptafluoropent-1-ene, 3,3,4,4,4-Pentafluorobutene, 1H,1H,2H-perfluoro-1-decene, 1H,1H,2H-perfluoro-1-dodecene, 1H,1H,2H-perfluoro-1-hexene, 3-(perfluoro-n-hexyl)prop-2-en-1-ol, 11-(perfluoro-n-hexyl)undec-10-en-1-ol, 1H,1H,2H-perfluoro-1-octene, (3-perfluoro-n-octyl)prop-2-enol, 11-(perfluoro-n-octyl)undec-10-en-1-ol, (2H-perfluoropropyl)-2-propenylether, 1,1,1-trifluoro-2-butene, 4,4,4-trifluorobut-2-en-1-ol, 2-(trifluoromethyl)propene, 3,3,3-trifluoropropene, 4,5,5,6,6,6-hexafluoro-4-(trifluoromethyl)-hex-2-ene, 4,5,5,6,6,6-hexafluoro-3-(trimethyl)-hex-2-en-1-ol, 1,1,1,2,2,3-hexafluoro-3-trifluoromethylnon-4-ene, 1H,1H,7H-perfluorohept-1-ene, 11-(perfluoro-n-octyl)undec-10-en-1-ol, (2H-perfluoropropyl)-2-propenylether, 1,1,1-trifluoro-2-butene and 4,4,4-trifluorobut-2-en-1-ol.

10. The polymer according to claim 6, wherein Z represents at least one selected from the group consisting of vinylalcohol, methylvinylether, ethylvinylether, 3,4-dihydropyran, 2,3-dihydrofuran, trimethylvinylsilane, triethylvinylsilane, allyl-2,2,2-trifluoroether, allylalcohol, allylethylether, allyl-n-propylether, allyltrimethylsilane, heptafluoro-3,3-bis(trifluoromethyl)-1-hexane, 1H,1H,2H-heptafluoropent-1-ene, 3,3,4,4,4-Pentafluorobutene, 1H,1H,2H-perfluoro-1-decene, 1H,1H,2H-perfluoro-1-dodecene, 1H,1H,2H-perfluoro-1-hexene, 3-(perfluoro-n-hexyl)prop-2-en-1-ol, 11-(perfluoro-n-hexyl)undec-10-en-1-ol, 1H,1H,2H-perfluoro-1-octene, (3-perfluoro-n-octyl)prop-2-enol, 11-(perfluoro-n-octyl)undec-10-en-1-ol, (2H-perfluoropropyl)-2-propenylether, 1,1,1-trifluoro-2-butene, 4,4,4-trifluorobut-2-en-1-ol, 2-(trifluoromethyl)propene, 3,3,3-trifluoropropene, 4,5,5,6,6,6-hexafluoro-4-(trifluoromethyl)-hex-2-ene, 4,5,5,6,6,6-hexafluoro-3-(trimethyl)-hex-2-en-1-ol, 1,1,1,2,2,3-hexafluoro-3-trifluoromethylnon-4-ene, 1H,1H,7H-perfluorohept-1-ene, 11-(perfluoro-n-octyl)undec-10-en-1-ol, (2H-perfluoropropyl)-2-propenylether, 1,1,1-trifluoro-2-butene and 4,4,4-trifluorobut-2-en-1-ol.

11. The polymer according to claim 7, wherein Z represents at least one selected from the group consisting of vinylalcohol, methylvinylether, ethylvinylether, 3,4-dihydropyran, 2,3-dihydrofuran, trimethylvinylsilane, triethylvinylsilane, allyl-2,2,2-trifluoroether, allylalcohol, allylethylether, allyl-n-propylether, allyltrimethylsilane, heptafluoro-3,3-bis(trifluoromethyl)-1-hexane, 1H,1H,2H-heptafluoropent-1-ene, 3,3,4,4,4-Pentafluorobutene, 1H,1H,2H-perfluoro-1-decene, 1H,1H,2H-perfluoro-1-dodecene, 1H,1H,2H-perfluoro-1-hexene, 3-(perfluoro-n-hexyl)prop-2-en-1-ol, 11-(perfluoro-n-hexyl)undec-10-en-1-ol, 1H,1H,2H-perfluoro-1-octene, (3-perfluoro-n-octyl)prop-2-enol, 11-(perfluoro-n-octyl)undec-10-en-1-ol, (2H-perfluoropropyl)-2-propenylether, 1,1,1-trifluoro-2-butene, 4,4,4-trifluorobut-2-en-1-ol, 2-(trifluoromethyl)propene, 3,3,3-trifluoropropene, 4,5,5,6,6,6-hexafluoro-4-(trifluoromethyl)-hex-2-ene, 4,5,5,6,6,6-hexafluoro-3-(trimethyl)-hex-2-en-1-ol, 1,1,1,2,2,3-hexafluoro-3-trifluoromethylnon-4-ene, 1H,1H,7H-perfluorohept-1-ene, 11-(perfluoro-n-octyl)undec-10-en-1-ol, (2H-perfluoropropyl)-2-propenylether, 1,1,1-trifluoro-2-butene and 4,4,4-trifluorobut-2-en-1-ol.

12. The polymer according to claim 1, wherein $R_1$ is hydrogen, and Z represents —C₃OOR₄R₅, forming the polymer having Chemical Structure (4)

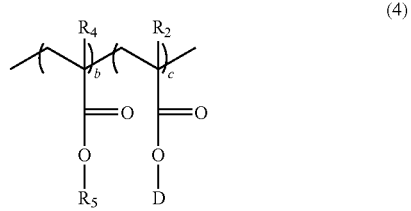

(4)

wherein R₁ represents hydrogen or a methyl group, and R₅ represents at least one selected from the group consisting of a normal or branched alkyl group including 1-20 carbons, t-butyl, isonorbornyl, 2-methyl-2-adamantyl, 2-ethyl-2-adamantyl, 3-tetrahydrofuranyl, 3-oxocyclohexyl, γ-butyllactone-3-yl, mavaloniclactone, γ-butyro lactone-2-yl, 3-methyl-γ-butyrolactone-3-yl, 2-tetrahydropyranyl, 2-tetrahydrofuranyl, 2,3-propylenecarbonate-1-yl, 1-methoxyethyl, 1-ethoxyethyl, 1-(2-methoxyethoxy)ethyl, 1-(2-acetoxyethoxy)ethyl, t-buthoxycarbonylmethyl, methoxymethyl, ethoxymethyl, trifluoromethyl and α,α,α-trifluoroethyl.

13. The polymer according to claim 6, wherein R₃ is at least one selected from the group consisting of methyl, ethyl, n-propyl, i-propyl, n-butyl, i-butyl, t-butyl, trifluoromethyl, α,α,α-trifluoroethyl and trideutenomethyl.

14. The polymer according to claim 7, wherein R₃ is at least one selected from the group consisting of methyl, ethyl, n-propyl, i-propyl, n-butyl, i-butyl, t-butyl, trifluoromethyl, α,α,α-trifluoroethyl and trideuteriomethyl.

15. A top coating layer, comprising the polymer according to claim 1.

16. A top coating composition, comprising
an organic solvent including 4-12 carbons; and
the polymer according to claim 1,
wherein the polymer has a percentage of solution by mass (mass %) of 0.1%-5% of a total weight of the top coating composition.

17. The polymer according to claim 16, wherein the expression b+c=1 is satisfied.

18. The top coating composition according to claim 16, wherein the organic solvent is at least one selected from the group consisting of n-propylalcohol, i-propylalcohol, n-butanol, 2-butanol, 3-methyl-2-butanol, n-pentanol, 2-pentanol, 3-methyl-2-pentanol, 4-methyl-2-pentanol, 1-octanol, 2-octanol, 1-decanol, 2-decanol, deuterated-n-propylalcohol-d, deuterated-i-propylalcohol-d, deuterated-n-butanol-d, deuterated-2-butanol-d, deuterated-3-methyl-2-butanol-d, deuterated-n-pentanol-d, deuterated-2-pentanol-d, deuterated-3-methyl-2-pentanol-d, deuterated-4-methyl-2-pentanol-d, deuterated-1-octanol-d, deuterated-2-octanol-d, deuterated-1-decanol-d, deuterated-2-decanol-d, n-heptane, n-octane, n-nonane, n-decane, n-undecane and n-dodecane.

19. The top coating composition according to claim 16, wherein Z is at least one selected from the group consisting of vinylalcohol, methylvinylether, ethylvinylether, 3,4-dihydropyran, 2,3-dihydrofuran, trimethylvinylsilane, triethylvinylsilane, allyl-2,2,2-trifluoroether, allylalcohol, allylethylether, allyl-n-propylether, allyltrimethylsilane, heptafluoro-3,3-bis(trifluoromethyl)-1-hexane, 1H,1H,2H-heptafluoropent-1-ene, 3,3,4,4,4-Pentafluorobutene, 1H,1H,2H-perfluoro-1-decene, 1H,1H,2H-perfluoro-1-dodecene, 1H,1H,2H-perfluoro-1-hexene, 3-(perfluoro-n-hexyl)prop-2-en-1-ol, 11-(perfluoro-n-hexyl)undec-10-en-1-ol, 1H,1H,2H-perfluoro-1-octene, (3-perfluoro-n-octyl)prop-2-enol, 11-(perfluoro-n-octyl)undec-10-en-1-ol, (2H-perfluoropropyl)-2-propenylether, 1,1,1-trifluoro-2-butene, 4,4,4-trifluorobut-2-en-1-ol, 2-(trifluoromethyl)propene, 3,3,3-trifluoropropene, 4,5,5,6,6,6-hexafluoro-4-(trifluoromethyl)-hex-2-ene, 4,5,5,6,6,6-hexafluoro-3-(trimethyl)-hex-2-en-1-ol, 1,1,1,2,2,3-hexafluoro-3-trifluoromethylnon-4-ene, 1H,1H,7H-perfluorohept-1-ene, 11-(perfluoro-n-octyl)undec-10-en-1-ol, (2H-perfluoropropyl)-2-propenylether, 1,1,1-trifluoro-2-butene and 4,4,4-trifluorobut-2-en-1-ol.

20. The top coating composition according to claim 16, wherein Z is CH₂C(R₄)COO(R₅) wherein R₄ is hydrogen or a methyl group, and R₅ is at least one selected from the group consisting of normal or branched alkyl group including 1-20 carbons, t-butyl, isonorbornyl, 2-methyl-2-adamantyl, 2-ethyl-2-adamantyl, 3-tetrahydrofuranyl, 3-oxocyclohexyl, γ-butyllactone-3-yl, mavaloniclactone, γ-butyro lactone-2-yl, 3-methyl-γ-butyrolactone-3-yl, 2-tetrahydropyranyl, 2-tetrahydrofuranyl, 2,3-propylenecarbonate-1-yl, 1-methoxyethyl, 1-ethoxyethyl, 1-(2-methoxyethoxy)ethyl, 1-(2-acetoxyethoxy)ethyl, t-buthoxycarbonylmethyl, methoxymethyl, ethoxymethyl, trifluoromethyl and α,α,α-trifluoroethyl.

21. The top coating composition according to claim 16, wherein R₃ is at least one selected from the group consisting of methyl, ethyl, n-propyl, i-propyl, n-butyl, i-butyl, t-butyl, trifluoromethyl, α,α,α-trifluoroethyl and trideuteriomethyl.

22. The top coating composition according to claim 16, wherein the R₁ is —COOR₃, and R₂ is hydrogen, forming the polymer having Chemical Structure (2).

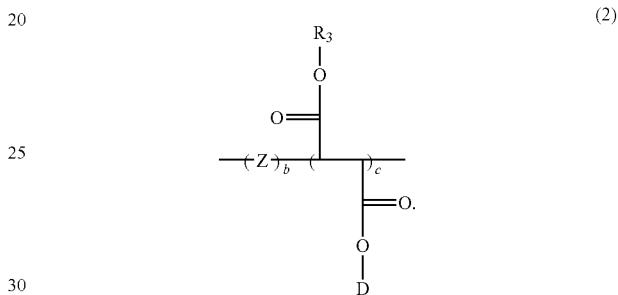

(2)

23. The top coating composition according to claim 22, further comprising a third monomer (X), forming the polymer having Chemical Structure (3)

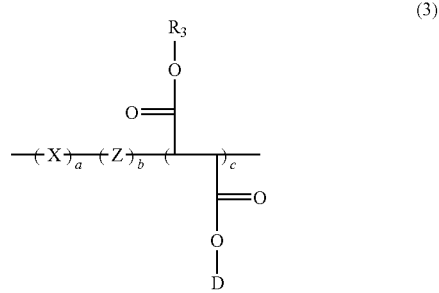

(3)

wherein X is at least one selected from the group consisting of a vinyl monomer and an allyl monomer.

24. The polymer according to claim 23, wherein the expression a+b+c=1 is satisfied.

25. The top coating composition according to claim 23, wherein X is at least one selected from the group consisting of vinylalcohol, methylvinylether, ethylvinylether, 3,4-dihydropyran, 2,3-dihydrofuran, trimethylvinylsilane, triethylvinylsilane, allyl-2,2,2-trifluoroether, allylalcohol, allylethylether, allyl-n-propylether, allyltrimethylsilane, heptafluoro-3,3-bis(trifluoromethyl)-1-hexane, 1H,1H,2H-heptafluoropent-1-ene, 3,3,4,4,4-Pentafluorobutene, 1H,1H,2H-perfluoro-1-decene, 1H,1H,2H-perfluoro-1-dodecene, 1H,1H,2H-perfluoro-1-hexene, 3-(perfluoro-n-hexyl)prop-2-en-1-ol, 11-(perfluoro-n-hexyl)undec-10-en-1-ol, 1H, 1H,2H-perfluoro-1-octene, (3-perfluoro-n-octyl)prop-2-enol, 11-(perfluoro-n-octyl)undec-10-en-1-ol, (2H-perfluoropropyl)-2-propenylether, 1,1,1-trifluoro-2-butene, 4,4,4-trifluorobut-2- en-1-ol, 2-(trifluoromethyl)propene, 3,3,3-trifluoropropene, 4,5,5,6,6,6-hexafluoro-4-(trifluoromethyl)-hex-2-ene, 4,5,5,6,6,6-hexafluoro-3-(trimethyl)-hex-2-en-1-ol, 1,1,1,2,2,3-hexafluoro-3-trifluoromethylnon-4-ene, 1H,1H,7H-perfluorohept-1-ene, 11-(perfluoro-n-octyl)undec-10-en-1-ol, (2H-perfluoropropyl)-2-propenylether, 1,1,1-trifluoro-2-butene and 4,4,4-trifluorobut-2-en-1-ol.

26. The top coating composition according to claim 22, wherein Z is at least one selected from the group consisting of vinylalcohol, methylvinylether, ethylvinylether, 3,4-dihydropyran, 2,3-dihydrofuran, trimethylvinylsilane, triethylvinylsilane, allyl-2,2,2-trifluoroether, allylalcohol, allylethylether, allyl-n-propylether, allyltrimethylsilane, heptafluoro-3,3-bis(trifluoromethyl)-1-hexane, 1H,1H,2H-heptafluoropent-1-ene, 3,3,4,4,4-Pentafluorobutene, 1H,1H,2H-perfluoro-1-decene, 1H, 1H,2H-perfluoro-1-dodecene, 1H,1H,2H-perfluoro-1-hexene, 3-(perfluoro-n-hexyl)prop-2-en-1-ol, 11-(perfluoro-n-hexyl)undec-10-en-1-ol, 1H, 1H,2H-perfluoro-1-octene, (3-perfluoro-n-octyl)prop-2-enol, 11-(perfluoro-n-octyl)undec-10-en-1-ol, (2H-perfluoropropyl)-2-propenylether, 1,1,1-trifluoro-2-butene, 4,4,4-trifluorobut-2-en-1-ol, 2-(trifluoromethyl)propene, 3,3,3-trifluoropropene, 4,5,5,6,6,6-hexafluoro-4-(trifluoromethyl)-hex-2-ene, 4,5,5,6,6,6-hexafluoro-3-(trimethyl)-hex-2-en-1-ol, 1,1,1,2,2,3-hexafluoro-3-trifluoromethylnon-4-ene, 1H,1H,7H-perfluorohept-1-ene, 11-(perfluoro-n-octyl)undec-10-en-1-ol, (2H-perfluoropropyl)-2-propenylether, 1,1,1-trifluoro-2-butene and 4,4,4-trifluorobut-2-en-1-ol.

27. The top coating composition according to claim 23, wherein Z is at least one selected from the group consisting of vinylalcohol, methylvinylether, ethylvinylether, 3,4-dihydropyran, 2,3-dihydrofuran, trimethylvinylsilane, triethylvinylsilane, allyl-2,2,2-trifluoroether, allylalcohol, allylethylether, allyl-n-propylether, allyltrimethylsilane, heptafluoro-3,3-bis(trifluoromethyl)-1-hexane, 1H,1H,2H-heptafluoropent-1-ene, 3,3,4,4,4-Pentafluorobutene, 1H,1H,2H-perfluoro-1-decene, 1H,1H,2H-perfluoro-1-dodecene, 1H,1H,2H-perfluoro-1-hexene, 3-(perfluoro-n-hexyl)prop-2-en-1-ol, 11-(perfluoro-n-hexyl)undec-10-en-1-ol, 1H,1H,2H-perfluoro-1-octene, (3-perfluoro-n-octyl)prop-2-enol, 11-(perfluoro-n-octyl)undec-10-en-1-ol, (2H-perfluoropropyl)-2-propenylether, 1,1,1-trifluoro-2-butene, 4,4,4-trifluorobut-2-en-1-ol, 2-(trifluoromethyl)propene, 3,3,3-trifluoropropene, 4,5,5,6,6,6-hexafluoro-4-(trifluoromethyl)-hex-2-ene, 4,5,5,6,6,6-hexafluoro-3-(trimethyl)-hex-2-en-1-ol, 1,1,1,2,2,3-hexafluoro-3-trifluoromethylnon-4-ene, 1H,1H,7H-perfluorohept-1-ene, 11-(perfluoro-n-octyl)undec-10-en-1-ol, (2H-perfluoropropyl)-2-propenylether, 1,1,1-trifluoro-2-butene and 4,4,4-trifluorobut-2-en-1-ol.

28. The top coating composition according to claim 16, wherein $R_1$ is hydrogen and Z represents —$C_3OOR_4R_5$, forming the polymer having Chemical Structure (4)

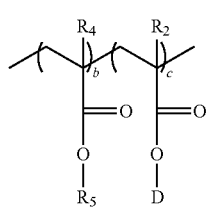

(4)

wherein $R_4$ represents hydrogen or a methyl group, and $R_5$ is at least one selected from the group consisting of a normal or branched alkyl group including 1-20 carbons, t-butyl, isonorbornyl, 2-methyl-2-adamantyl, 2-ethyl-2-adamantyl, 3-tetrahydrofuranyl, 3-oxocyclohexyl, γ-butyllactone-3-yl, mavaloniclactone, γ-butyro lactone-2-yl, 3-methyl-γ-butyrolactone-3-yl, 2-tetrahydropyranyl, 2-tetrahydrofuranyl, 2,3-propylenecarbonate-1-yl, 1-methoxyethyl, 1-ethoxyethyl, 1-(2-methoxyethoxy)ethyl, 1-(2-acetoxyethoxy)ethyl, t-buthoxycarbonylmethyl, methoxymethyl, ethoxymethyl, trifluoromethyl and α,α,α-trilluoroethyl.

29. The top coating composition according to claim 22, wherein $R_3$ is at least one selected from the group consisting of methyl, ethyl, n-propyl, i-propyl, n-butyl, i-butyl, t-butyl, trifluoromethyl, α,α,α-trifluoroethyl and trideuteriomethyl.

30. The top coating composition according to claim 23, wherein $R_3$ is at least one selected from the group consisting of methyl, ethyl, n-propyl, i-propyl, n-butyl, i-butyl, t-butyl, trifluoromethyl, α,α,α-trifluoroethyl and trideuteriomethyl.

31. The top coating composition according to claim 16, wherein the polymer is includes 1.0-3.0 weight % of a total weight of the top coating composition.

32. An immersion lithography process, comprising:
  forming a photoresist layer on a wafer;
  forming a top coating layer on the photoresist layer; wherein the top coating layer includes a polymer having Chemical Structure (1)

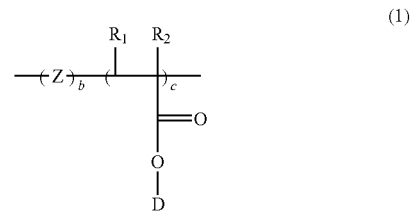

(1)

wherein $R_1$ represents hydrogen or $COOR_3$, wherein $R_3$ represents deuterium, a deuterated or hydrogenated normal alkyl group including 1-20 carbons and a deuterated or hydrogenated branched alkyl group including 1-20 carbons, $R_2$ represents hydrogen or a methyl group, Z represents at least one selected from the group consisting of a vinyl monomer, an allyl monomer and an acrylate monomer and an average molecular weight of the polymer is 1000-100000,
  placing the wafer having the top coating layer in water;
  performing an exposure process on the photoresist layer; and
  forming photoresist patterns by removing the top coating layer and softened photoresist layer.

33. The polymer according to claim 32, wherein the expression b+c=1 is satisfied.

34. The process according to claim 32, wherein forming the top coating layer includes:
  coating a top coating composition including the polymer and an organic solvent on the photoresist layer; and
  baking the wafer,
  wherein the solvent includes 4-12 carbons and the polymer includes 0.1-5 weight % of a total weight of the top coating composition.

35. The process according to claim 34, wherein the organic solvent is at least one selected from the group consisting of n-propylalcohol, i-propylalcohol, n-butanol, 2-butanol, 3-methyl-2-butanol, n-pentanol, 2-pentanol, 3-methyl-2-pentanol, 4-methyl-2-pentanol, 1-octanol, 2-octanol, 1-decanol, 2-decanol, deuterated-n-propylalcohol-d, deuteratedi-propylalcohol-d, deuterated-n-butanol-d, deuterated-2-butanol-d, deuterated-3-methyl-2-butanol-d, deuterated-n-pentanol-d, deuterated-2-pentanol-d, deuterated-3-methyl-2-pentanol-d, deuterated-4-methyl-2-pentanol-d, deuterated-1-octanol-d, deuterated-2-octanol-d, deuterated-1-decanol-d, deuterated-2-decanol-d, n-heptane, n-octane, n-nonane, n-decane, n-undecane and n-dodecane.

36. The process according to claim 34, wherein Z is at least one selected from the group consisting of vinylalcohol, methylvinylether, ethylvinylether, 3,4-dihydropyran, 2,3-dihydrofuran, trimethylvinylsilane, triethylvinylsilane, allyl-2,2,2-trifluoroether, allylalcohol, allylethylether, allyl-n-propylether, allyltrimethylsilane, heptafluoro-3,3-bis(trifluoromethyl)-1-hexane, 1H,1H,2H-heptafluoropent-1-ene, 3,3,4,4,4-Pentafluorobutene, 1H,1H,2H-perfluoro-1-decene, 1H,1H,2H-perfluoro-1-dodecene, 1H,1H,2H-perfluoro-1-hexene, 3-(perfluoro-n-hexyl)prop-2-en-1-ol, 11-(perfluoro-n-hexyl)undec-10-en-1-ol, 1H,1H,2H-perfluoro-1-octene, (3-perfluoro-n-octyl)prop-2-enol, 11-(perfluoro-n-octyl)undec-10-en-1-ol, (2H-perfluoropropyl)-2-propenylether, 1,1,1-trifluoro-2-butene, 4,4,4-trifluorobut-2-en-1-ol, 2-(trifluoromethyl)propene, 3,3,3-trifluoropropene, 4,5,5,6,6,6-hexafluoro-4-(trifluoromethyl)-hex-2-ene, 4,5,5,6,6,6-hexaifluoro-3-(trimethyl)-hex-2-en-1-ol, 1,1,1,2,2,3-hexyfluoro-3-trifluoromethylnon-4-ene, 1H,1H,7H-perfluorohept-1-ene, 11-(perfluoro-n-octyl)undec-10-en-1-ol, (2H-perfluoropropyl)-2-propenylether, 1,1,1-trifluoro-2-butene and 4,4,4-trifluorobut-2-en-1-ol.

37. The process according to claim 34, wherein Z is $CH_2C(R_4)COO(R_5)$, wherein $R_4$ is hydrogen or a methyl group, and $R_5$ is at least one selected from the group consisting of normal or branched alkyl group including 1-20 carbons, t-butyl, isonorbornyl, 2-methyl-2-adamantyl, 2-ethyl-2-adamantyl, 3-tetrahydrofuranyl, 3-oxocyclohexyl, γ-butyllactone-3-yl, mavaloniclactone, γ-butyro lactone-2-yl, 3-methyl-γ-butyrolactone-3-yl, 2-tetrahydropyranyl, 2-tetrahydrofuranyl, 2,3-propylenecarbonate-1-yl, 1-methoxyethyl, 1-ethoxyethyl, 1-(2-methoxyethoxy)ethyl, 1-(2-acetoxyethoxy)ethyl, t-buthoxycarbonylmethyl, methoxymethyl, ethoxymethyl, trifluoromethyl and α,α,α-trifluoroethyl.

38. The process according to claim 34, wherein $R_3$ is at least one selected from the group consisting of methyl, ethyl, n-propyl, i-propyl, n-butyl, i-butyl, t-butyl, trifluoromethyl, α,α,α-trifluoroethyl and trideuteriomethyl.

39. The process according to claim 32, wherein $R_1$ is —$COOR_3$ and $R_3$ is hydrogen forming the polymer having Chemical Structure (2).

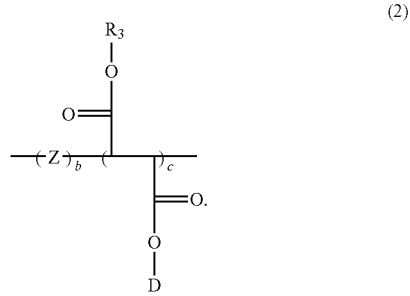

(2)

40. The process according to claim 39, further comprising a third monomer (X), forming the polymer having Chemical Structure (3)

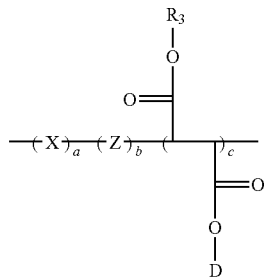

(3)

wherein X is at least one selected from the group consisting of a vinyl monomer and an allyl monomer.

41. The polymer according to claim 40, wherein the expression a+b+c=1 is satisfied.

42. The process according to claim 40, wherein X is at least one selected from the group consisting of vinylalcohol, methylvinylether, ethylvinylether, 3,4-dihydropyran, 2,3-dihydrofuran, trimethylvinylsilane, triethylvinylsilane, allyl-2,2,2-trifluoroether, allylalcohol, allylethylether, allyl-n-propylether, allyltrimethylsilane, heptafluoro-3,3-bis(trifluoromethyl)-1-hexane, 1H,1H,2H-heptafluoropent-1-ene, 3,3,4,4,4-Pentafluorobutene, 1H, 1H,2H-perfluoro-1-decene, 1H, 1H,2H-perfluoro-1-dodecene, 1H, 1H,2H-perfluoro-1-hexene, 3-(perfluoro-n-hexyl)prop-2-en-1-ol, 11-(perfluoro-n-hexyl)undec-10-en-1-ol, 1H,1H,2H-perfluoro-1-octene, (3-perfluoro-n-octyl)prop-2-enol, 11-(perfluoro-n-octyl)undec-10-en-1-ol, (2H-perfluoropropyl)-2-propenylether, 1,1,1-trifluoro-2-butene, 4,4,4-trifluorobut-2-en-1-ol, 2-(trifluoromethyl)propene, 3,3,3-trifluoropropene, 4,5,5,6,6,6-hexafluoro-4-(trifluoromethyl)-hex-2-ene, 4,5,5,6,6,6-hexafluoro-3-(trimethyl)-hex-2-en-1-ol, 1,1,1,2,2,3-hexafluoro-3-trifluoromethylnon-4-ene, 1H,1H,7H-perfluorohept-1-ene, 11-(perfluoro-n-octyl)undec-10-en-1-ol, (2H-perfluoropropyl)-2-propenylether, 1,1,1-trifluoro-2-butene and 4,4,4-trifluorobut-2-en-1-ol.

43. The process according to claim 39, wherein Z is at least one selected from the group consisting of vinylalcohol, methylvinylether, ethylvinylether, 3,4-dihydropyran, 2,3-dihydrofuran, trimethylvinylsilane, triethylvinylsilane, allyl-2,2,2-trifluoroether, allylalcohol, allylethylether, allyl-n-propylether, allyltrimethylsilane, heptafluoro-3,3-bis(trifluoromethyl)-1-hexane, 1H,1H,2H-heptafluoropent-1-ene, 3,3,4,4,4-Pentailuorobutene, 1H, 1H,2H-perfluoro-1-decene, 1H,1H,2H-perfluoro-1-dodecene, 1H,1H,2H-perfluoro-1-hexene, 3-(perfluoro-n-hexyl)prop-2-en-1-ol, 11-(perfluoro-n-hexyl)undec-10-en-1-ol, 1H,1H,2H-perfluoro-1-octene, (3-perfluoro-n-octyl)prop-2-enol, 11-(perfluoro-n-octyl)undec-10-en-1-ol, (2H-perfluoropropyl)-2-propenylether, 1,1,1-trifluoro-2-butene, 4,4,4-trifluorobut-2-en-1-ol, 2-(trifluoromethyl)propene, 3,3,3-trifluoropropene, 4,5,5,6,6,6-hexafluoro-4-(trifluoromethyl)-hex-2-ene, 4,5,5,6,6,6-hexafluoro-3-(trimethyl)-hex-2-en-1-ol, 1,1,1,2,2,3-hexafluoro-3-trifluoromethylnon-4-ene, 1H,1H,7H-perfluorohept-1-ene, 11-(perfluoro-n-octyl)undec-10-en-1-ol, (2H-perfluoropropyl)-2-propenylether, 1,1,1-trifluoro-2-butene and 4,4,4-trifluorobut-2-en-1-ol.

44. The process according to claim 40, wherein Z is at least one selected from the group consisting of vinylalcohol, methylvinylether, ethylvinylether, 3,4-dihydropyran, 2,3-dihydrofuran, trimethylvinylsilane, triethylvinylsilane, allyl-2,2,2-trifluoroether, allylalcohol, allylethylether, allyl-n-propylether, allyltrimethylsilane, heptafluoro-3,3-bis(trifluoromethyl)-1-hexane, 1H,1H,2H-heptafluoropent-1-ene, 3,3,4,4,4-Pentafluorobutene, 1H,1H,2H-perfluoro-1- decene, 1H, 1H,2H-perfluoro-1-dodecene, 1H, 1H,2H-perfluoro-1-hexene, 3-(perfluoro-n-hexyl)prop-2-en-1-ol, 11-(perfluoro-n-hexyl)undec-10-en-1-ol, 1H, 1H,2H-perfluoro-1-octene, (3-perfluoro-n-octyl)prop-2-enol, 11-(perfluoro-n-octyl)undec-10-en-1-ol, (2H-perfluoropropyl)-2-propenylether, 1,1,1-trifluoro-2-butene, 4,4,4-trifluorobut-2-en-1-ol, 2-(trifluoromethyl)propene, 3,3,3-trifluoropropene, 4,5,5,6,6,6-hexafluoro-4-(trifluoromethyl)-hex-2-ene, 4,5,5,6,6,6-hexafluoro-3-(trimethyl)-hex-2-en-1-ol, 1,1,1,2,2,3-hexafluoro-3-trifluoromethylnon-4-ene, 1H,1H,7H-perfluorohept-1-ene, 11-(perfluoro-n-octyl)undec-10-en-1-ol, (2H-perfluoropropyl)-2-propenylether, 1,1,1-trifluoro-2-butene and 4,4,4-trifluorobut-2-en-1-ol.

45. The process according to claim 32, wherein $R_1$ represents hydrogen and Z represents —$C_3OOOR_4R_5$, forming the polymer having Chemical Structure (4)

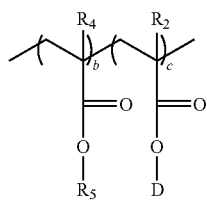

(4)

wherein $R_1$ represents hydrogen or a methyl group, and $R_5$ represents at least one selected from the group consisting of a normal or branched alkyl group including 1-20 carbons, t-butyl, isonorbornyl, 2-methyl-2-adamantyl, 2-ethyl-2-adamantyl, 3-tetrahydrofuranyl, 3-oxocyclohexyl, γ-butyllactone-3-yl, mavaloniclactone, γ-butyrolactone-2-yl, 3-methyl-γ-butyrolactone-3-yl, 2-tetrahydropyranyl, 2-tetrahydrofuranyl, 2,3-propylenecarbonate-1-yl, 1-methoxyethyl, 1-ethoxyethyl, 1-(2-methoxyethoxy)ethyl, 1-(2-acetoxyethoxy)ethyl, t-buthoxycarbonylmethyl, methoxymethyl, ethoxymethyl, trifluoromethyl and α,α,α-trifluoroethyl.

46. The process according to claim 39, wherein $R_3$ is at least one selected from the group consisting of methyl, ethyl, n-propyl, i-propyl, n-butyl, i-butyl, t-butyl, trifluoromethyl, α,α,α-trifluoroethyl and trideuteriomethyl.

47. The process according to claim 40, wherein $R_3$ is at least one selected from the group consisting of methyl, ethyl, n-propyl, i-propyl, n-butyl, i-butyl, t-butyl, trifluoromethyl, α,α,α-trifluoroethyl and trideuteriomethyl.

48. The process according to claim 34, wherein the polymer includes 1.0-3.0 weight % of the total weight of the top coating composition.

* * * * *